US012696296B2

(12) United States Patent
Baek

(10) Patent No.: US 12,696,296 B2
(45) Date of Patent: Jul. 28, 2026

(54) APPARATUS AND METHOD TO PROVIDE PAGING PRIORITY IN MULTICAST SERVICE SUPPORTING NETWORK

(71) Applicant: Samsung Electronics Co., Ltd., Suwon-si (KR)

(72) Inventor: Youngkyo Baek, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 493 days.

(21) Appl. No.: 18/064,068

(22) Filed: Dec. 9, 2022

(65) Prior Publication Data

US 2023/0189296 A1 Jun. 15, 2023

(30) Foreign Application Priority Data

Dec. 10, 2021 (KR) ........................ 10-2021-0176834

(51) Int. Cl.
*H04W 72/30* (2023.01)
*H04W 72/54* (2023.01)
(52) U.S. Cl.
CPC ........... *H04W 72/30* (2023.01); *H04W 72/54* (2023.01)
(58) Field of Classification Search
CPC ..... H04W 72/30; H04W 72/54; H04W 76/27; H04W 4/06; H04W 68/02; H04W 76/40
USPC ....................................................... 370/312
See application file for complete search history.

(56) References Cited

U.S. PATENT DOCUMENTS

| | | | |
|---|---|---|---|
| 2021/0014929 A1* | 1/2021 | Jing | H04W 4/90 |
| 2021/0075631 A1 | 3/2021 | Liao | |
| 2021/0127351 A1* | 4/2021 | Stojanovski | H04W 48/16 |
| 2021/0258918 A1 | 8/2021 | Hong | |
| 2023/0309189 A1* | 9/2023 | Rönneke | H04W 4/06 |
| 2024/0080931 A1* | 3/2024 | Jia | H04W 76/20 |
| 2024/0314523 A1* | 9/2024 | Gan | H04L 12/189 |

FOREIGN PATENT DOCUMENTS

| | | |
|---|---|---|
| WO | 2021150766 A1 | 7/2021 |
| WO | 2021177716 A2 | 9/2021 |

OTHER PUBLICATIONS

International Search Report and Written Opinion of the International Searching Authority dated Mar. 15, 2023, in connection with International Application No. PCT/KR2022/020056, 8 pages.

(Continued)

*Primary Examiner* — Chandrahas B Patel
*Assistant Examiner* — Meheret Woldegebreal Kidane

(57) ABSTRACT

The disclosure relates to a 5G or 6G communication system for supporting a higher data transmission rate. An embodiment relates to a method and apparatus for transmitting multicast data to a terminal in a 5G network. The method for transmitting multicast data to a terminal comprises: receiving, from a multicast broadcast session management function (MB-SMF), a first message for activating a multicast broadcast service (MBS) session; identifying information on a MBS QoS flow of at least one MBS QoS flow within the MBS session; and transmitting, to an access and mobility management function (AMF), a second message comprising the information on the MBS QoS flow for the AMF to transmit a paging message according to the information on the MBS QoS flow.

16 Claims, 9 Drawing Sheets

(56)         References Cited

OTHER PUBLICATIONS

3GPP TS 23.247 V17.0.0 (Sep. 2021), Technical Specification, 3rd Generation Partnership Project; Technical Specification Group Services and System Aspects; Architectural enhancements for 5G multicast-broadcast services; Stage 2 (Release 17), Sep. 2021, 91 pages.

Samsung, "Correction on MBS session activation procedure," S2-2107479, 3GPP TSG SA WG2 Meeting #147E, E-Meeting, Oct. 18-22, 2021, 5 pages.

Supplementary European Search Report dated Nov. 29, 2024, in connection with European Patent Application No. 22904721.2, 10 pages.

Ericsson, "Update [7.2) Multicast procedures with updated MB-SMF services," S2-2105640, SA WG2 Meeting #146E, E-Meeting, Aug. 16-27, 2021, 17 pages.

3GPP TS 23.247 V2.0.0 (Sep. 2021) Technical Specification, 3rd Generation Partnership Project; Technical Specification Group Services and System Aspects; Architectural enhancements for 5G multicast-broadcast services; Stage 2 (Release 17), 94 pages.

* cited by examiner

APPARATUS AND METHOD TO PROVIDE PAGING PRIORITY IN MULTICAST SERVICE SUPPORTING NETWORK

CROSS-REFERENCE TO RELATED APPLICATIONS

This application is based on and claims priority under 35 U.S.C. § 119 to Korean Patent Application No. 10-2021-0176834, filed on Dec. 10, 2021, in the Korean Intellectual Property Office, the disclosure of which is herein incorporated by reference in its entirety.

BACKGROUND

1. Field

The disclosure relates to a method and apparatus for transmitting multicast data to a terminal and, more particularly, to a method and apparatus for transmitting multicast data to a terminal in a fifth generation (5G) network.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced mobile broadband (eMBB), ultra-reliable low latency communications (URLLC), and massive machine-type communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of bandwidth part (BWP), new channel coding methods such as a low density parity check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, NR-U new radio unlicensed (NR-U) aimed at system operations conforming to various regulation-related requirements in unlicensed bands, NR UE power saving, non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step RACH for NR). There also has been ongoing standardization in system architecture/service regarding a 5G baseline architecture (for example, service based architecture or service based interface) for combining network functions virtualization (NFV) and software-defined networking (SDN) technologies, and mobile edge computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended reality (XR) for efficiently supporting augmented reality (AR), virtual reality (VR), nixed reality (MR) and the like, 5G performance improvement and complexity reduction by utilizing artificial intelligence (AI) and machine learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as full dimensional MIMO (FD-MIMO), array antennas and large-scale antennas, meta-material-based lenses and antennas for improving coverage of terahertz band signals, high-dimensional space multiplexing technology using orbital angular momentum (OAM), and reconfigurable intelligent surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

Meanwhile, in order to transmit the same data to a plurality of terminals located in a specific area in a mobile communication network, data may be transmitted to each terminal by unicast. In addition, in some cases, data may be provided through multicast to transmit the same data to a plurality of terminals in a mobile communication network for resource efficiency.

At this time, when multicast service traffic does not occur for a certain period of time for a multicast service, or when the application server wants to temporarily stop the corresponding multicast service, the multicast session for the corresponding multicast service can be inactivated to save resources. However, when the application server wants to activate the multicast service again or when the corresponding multicast service traffic occurs again, a method for activating the multicast session is required, and in particular, when terminals using the multicast service enter an idle state, a method for waking up the terminals is required. At this time, a method for giving priority to paging with terminals receiving a general unicast service or a method for giving priority to multicast paging when paging for another multicast service is required.

The above information is presented as background information only to assist with an understanding of the disclosure. No determination has been made, and no assertion is made, as to whether any of the above might be applicable as prior art with regard to the disclosure.

SUMMARY

An embodiment is to provide a method and apparatus for controlling priority for paging in a process of providing a multicast service to a terminal in an idle state in a mobile communication system.

In addition, an embodiment is to provide a method and apparatus for waking up a terminal in an idle state in consideration of a paging priority when a terminal receiving a multicast service is in an idle state in a mobile communication system.

The technical subjects pursued in the disclosure may not be limited to the above-mentioned technical subjects, and other technical subjects which are not mentioned may be clearly understood, through the following descriptions, by those skilled in the art to which the disclosure pertains.

In accordance with an aspect of the disclosure, a method performed by a session management function (SMF) in a communication system is provided. The method comprises: receiving, from a multicast broadcast session management function (MB-SMF), a first message for activating a multicast broadcast service (MBS) session; identifying information on a MBS QoS flow of at least one MBS QoS flow within the MBS session; transmitting, to the an access and mobility management function (AMF), a second message comprising the information on the MBS QoS flow for the AMF to transmit a paging message according to the information on the MBS QoS flow.

In an embodiment, the information on the MBS QoS flow comprises at least one of an allocation and retention priority (ARP) or 5G QoS (quality of service) identifier (5QI) of the MBS QoS flow.

In an embodiment, the second message further comprises a temporary mobile group identity (TMGI) of the MBS session.

In an embodiment, the first message comprises Nmb-smf_MBS_Session_ContextStatusNotify message, and the second message comprises Namf_MT_EnableGroupReachability request message.

In an embodiment, the first message is initiated based on at least one of the MB-SMF receives, from a multicast broadcast user plane function (MB-UPF), a notification for indicating an arrival of a downlink data for the MBS session, or the MB-SMF receives, from an application function (AF), a MBS session activation request for the MBS session.

In accordance with an aspect of the disclosure, a method performed by an access and mobility management function (AMF) in a communication system is provided. The method comprises: receiving, from a session management function (SMF), a message comprising information on a MB S QoS flow of at least one MB S QoS flow within a multicast broadcast service (MBS) session; and transmitting, to a base station, a paging request message according to the information on the MBS QoS flow.

In an embodiment, the information on the MBS QoS flow comprises at least one of an allocation and retention priority (ARP) or 5G QoS (quality of service) identifier (5QI) of the MBS QoS flow.

In an embodiment, the message further comprises a temporary mobile group identity (TMGI) of the MBS session.

In accordance with an aspect of the disclosure, a session management function (SMF) in a communication system is provided. The SMF comprises: a transceiver; and a controller coupled with the transceiver and configured to: receive, from a multicast broadcast session management function (MB-SMF), a first message for activating a multicast broadcast service (MBS) session, identify information a MBS QoS flow of at least one MBS QoS flow within the MBS session, transmit, to the an access and mobility management function (AMF), a second message comprising the information on the MBS QoS flow for the AMF to transmit a paging message according to the information on the MBS QoS flow.

In accordance with an aspect of the disclosure, an access and mobility management function (AMF) in a communication system is provided. The AMF comprises: a transceiver; and a controller coupled with the transceiver and configured to: receive, from a session management function (SMF), a message comprising information on a MBS QoS flow of at least one MBS QoS flow within a multicast broadcast service (MBS) session, and transmit, to a base station, a paging request message according to the information on the MBS QoS flow.

According to an embodiment, it is possible to smoothly use a multicast service by waking up a terminal of an idle state in consideration of priority for paging when activating an inactive multicast session for a terminal using a multicast service in a 5G system (5GS).

Advantageous effects obtainable from the disclosure may not be limited to the above-mentioned effects, and other effects which are not mentioned may be clearly understood, through the following descriptions, by those skilled in the art to which the disclosure pertains.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1 illustrates a 5GS structure for a multicast service according to an embodiment of the present disclosure;

FIG. 7 illustrates a process of configuring paging priority information and waking up a terminal in an idle state according to the process of activating a multicast session at the request of an AF according to an embodiment of the present disclosure;

DETAILED DESCRIPTION

Figure 1:
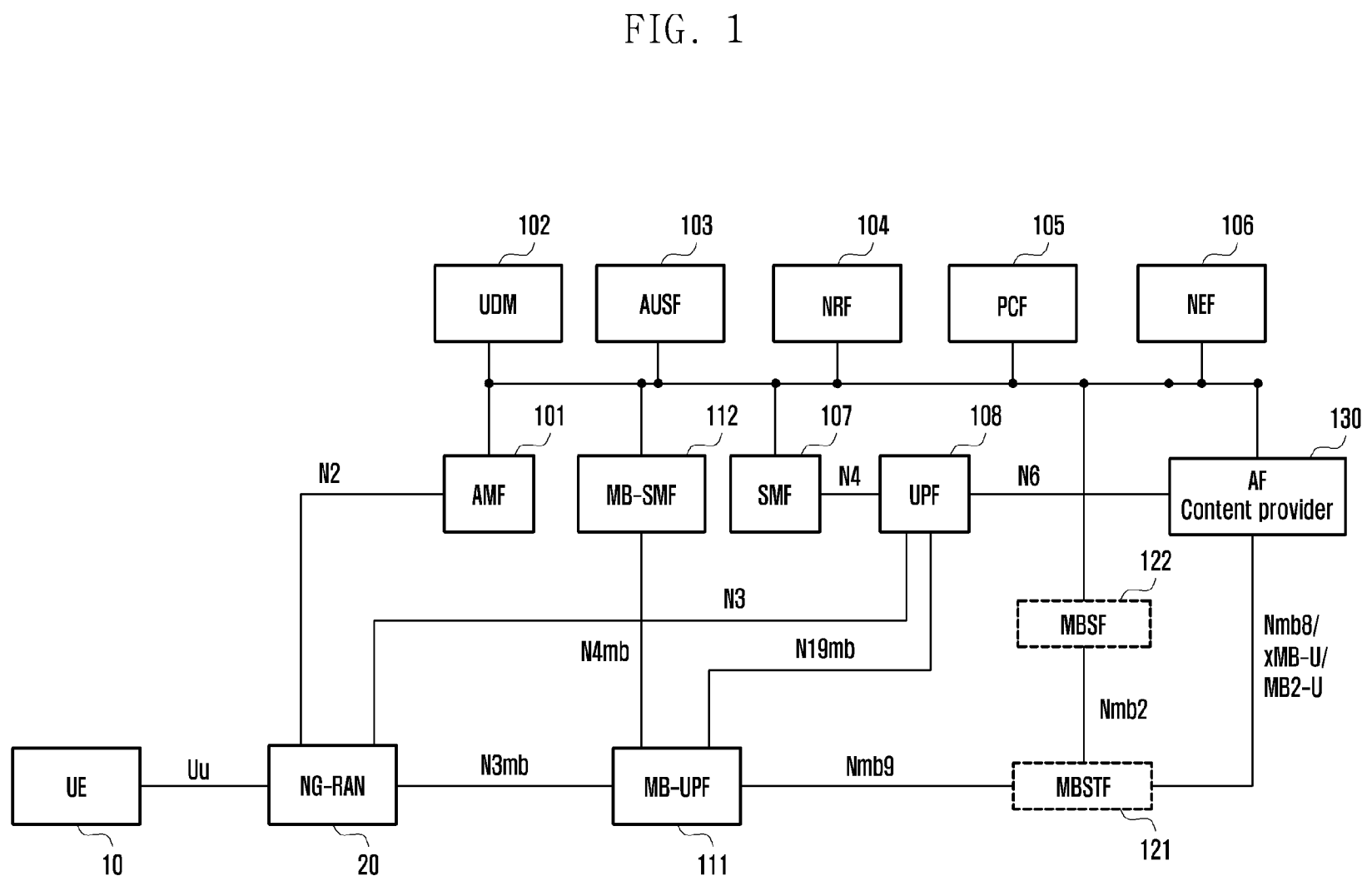
Figure 2:
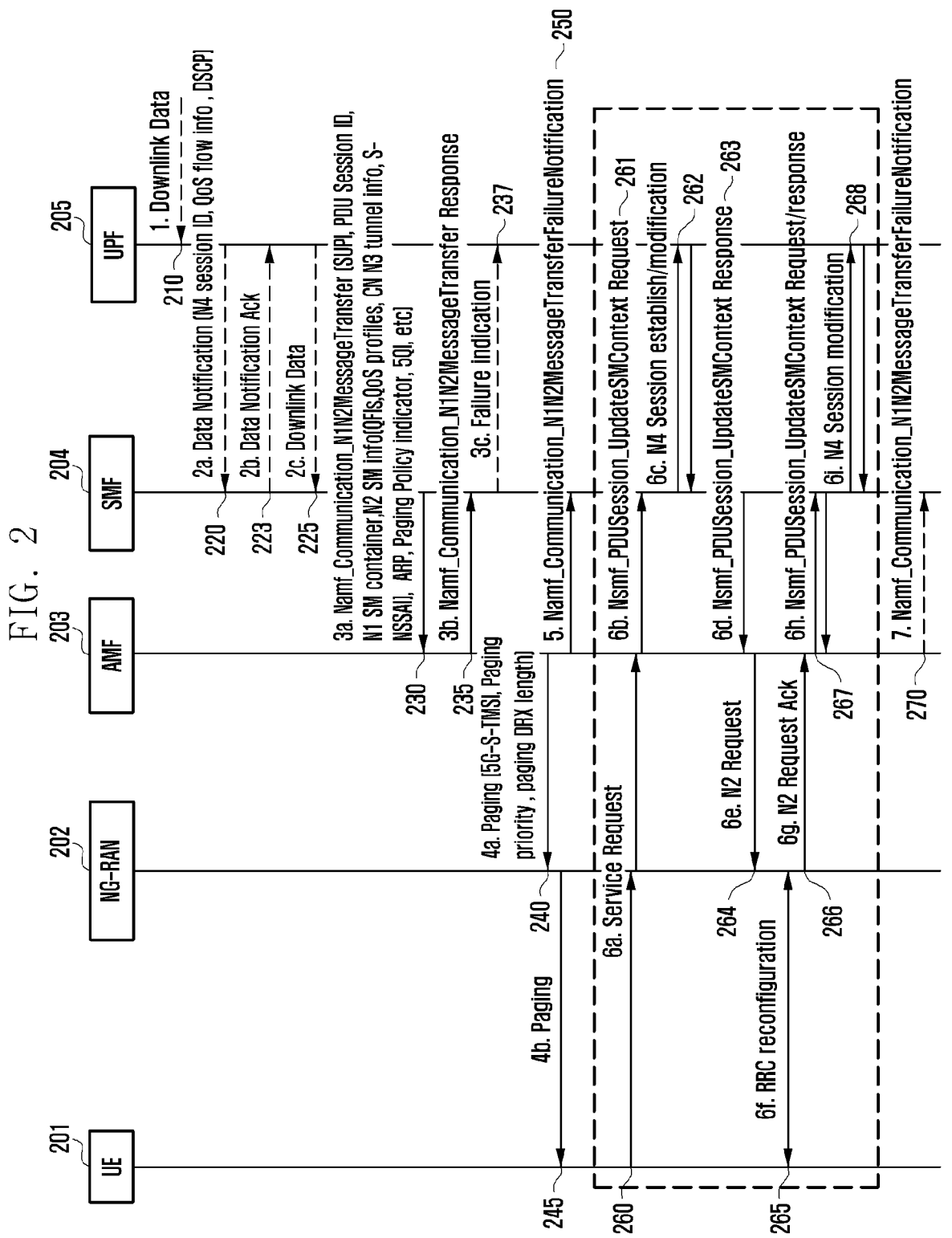
FIG. 2 illustrates a conventional process for waking up a terminal in an idle state in the process of activating a general unicast PDU session according to an embodiment of the present disclosure.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, exemplary embodiments of the disclosure will be described in detail with reference to the accompanying drawings. In describing the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

In the following description, terms for identifying access nodes, terms referring to network entities, terms referring to messages, terms referring to interfaces between network entities, terms referring to various identification information, and the like are illustratively used for the convenience of description. Therefore, the disclosure is not limited by the terms as used below, and other terms referring to subjects having equivalent technical meanings may be used.

In the following description, the disclosure will be described using terms and names defined in the 3rd generation partnership project long term evolution (3GPP LTE) and 5G standards for the convenience of description. However, the disclosure is not limited by these terms and names, and may be applied in the same way to systems that conform other standards.

Hereinafter, for convenience of description, the name of an NF (e.g., access and mobility management function (AMF), session management function (SMF), network slicing selection function (NSSF), etc.) is used for an object for exchanging information for access control and state management. However, the embodiments of the disclosure can be equally applied even when NF is actually implemented as an instance (each AMF Instance, SMF Instance, NSSF Instance, etc.).

First, the multicast service will be briefly reviewed. To provide the multicast service, the 5G system (5GS) may receive multicast service data from an application function (AF) or contents provider and deliver the multicast service data to an NG radio access network (NG-RAN) (base station, 5 g node B (gNB)), thereby transmitting the multicast service data to terminals (user equipment (UE)) subscribed to the multicast service. In the 5G core network, there are two methods of delivering multicast data to the NG-RAN, which is a base station of the 5G network, of shared delivery and individual delivery. When the NG-RAN has multicast/broadcast service (MBS) capability, the multicast service data may be transmitted from a multicast/broadcast user plane function (MB-UPF) that provides a multicast/broadcast service to an NG-RAN through a tunnel for shared delivery. On the other hand, when NG-RAN does not have MBS capability, because shared delivery is impossible, as an individual delivery, multicast service data may be delivered to a terminal through a tunnel from a corresponding UPF to an NG-RAN through a protocol data unit (PDU) session associated with MBS data received through an MB-UPF.

When a multicast session for a multicast service is deactivated, a tunnel for shared delivery and a tunnel for individual delivery are deactivated or released, and terminals receiving the multicast service may also be switched to an idle state.

Therefore, a method for waking up the terminal in an idle state is required. As a method for waking up terminals in an idle state, individual paging or group paging using a temporary mobile terminal group identifier (TMGI) or MBS session identifier (session ID) may be attempted for each terminal.

At this time, the group paging and individual paging are appropriately applied in a method of waking up terminals in an idle mode in a mobile communication network. Unlike the case of unicast service, it is necessary to configure a priority for paging for the multicast service and apply paging according to priority between paging for general unicast and paging for multicast. In the following embodiments, these problems and solutions will be described.

In addition, in the following description, terms and names defined in the 5G system standards are used for convenience of description. However, the disclosure is not limited by the above terms and names, and may be equally applied to systems conforming to other standards.

FIG. 1 illustrates a 5GS structure for a multicast service according to an embodiment of the present disclosure.

Referring to FIG. 1, a cellular system may include a user equipment (UE) 10, an NG radio access network (NG-RAN) 20 as a base station, an access and mobility management function (AMF) device 101, a multicast/broadcast user plane function, MB-UPF device 111, a multicast/broadcast-session management function (MB-SMF) device 112, policy control function (PCF) device 105, a session management function (SMF) device 107, a network exposure function (NEF) device 106, a multicast/broadcast service function (MBSF) device 122, a multicast/broadcast service traffic function (MBSTF) device 121, an application function (AF) device 130, a unified data management (UDM) device 102, a user plane function (UPF) device 108, an authentication server function (AUSF) device 103, and an NF repository function (NRF) device 104.

In the description of FIG. 1, each network function (NF) of 5GS will be described as a "network function device" or "network function" itself. However, those skilled in the art can appreciate that the NF and/or the NF device may be implemented in one specific server or two or more servers, and two or more NFs performing the same operation may be implemented in one server.

One NF or two or more NFs may be implemented as one network slice in some cases. These network slices can be created based on specific purposes. For example, it may be configured for a subscriber group to provide the same type of service to specific subscriber groups, such as maximum transmission rate, data usage, guaranteed minimum transmission rate, and the like. In addition, network slices can be implemented for various purposes. Here, additional description of the network slice will be omitted.

In addition, in FIG. 1, an interface between each node is illustrated. A Uu interface is used between the UE 10 and the NG-RAN 20, an N2 interface is used between the NG-RAN 20 and the AMF 101, an N3 interface is used between the NG-RAN 20 and the UPF 108, and an N3mb interface is used between the NG-RAN 20 and the MB-UPF 111. In addition, an N4mb interface is used between the MB-UPF 111 and the MB-SMF 112, and an N19mb interface is used between the MB-UPF 111 and the UPF 108. An N4 interface is used between the SMF 107 and the UPF 108, an N6 interface is used between the UPF 108 and the AF 130, and an Nmb2 interface is used between the MBSF 122 and the MBSTF 121. In addition, an Nmb9 interface is used between the MB-UPF 111 and the MBSTF 121. In addition, an Mmb8/xMB-U/MB2 interface is used between the AF 130 and the MBSTF 121.

Since these interfaces are defined in the NR standard, further description will be omitted here.

In general, in order to support the MBS service in 5GS, a cellular system for MBS may be configured with the following network function devices and services.

The AF 130 may be, for example, a V2X application server, a Cellular Internet of Things (CIoT) application server, a mission-critical push-to-talk (MCPTT) application, a content provider, a TV or audio service provider, a streaming video service provider, and the like.

The AF 130 may request MBS service provision from the MBSF 122, which is an NF that controls session management and traffic of the MBS service, in order to provide the MBS service. The MBSF 122 may become an NF that receives an MBS service request from the AF 130, manages a corresponding MBS service session, and controls corresponding MBS service traffic. In addition, the MB STF 121 is an NF that receives media from an AF providing MBS, from an application server (AS) providing MBS, or from a contents provider, based on the control of MBSF 122 and processes media traffic, and may operate as an MBS service anchor in 5GS.

Alternatively, in a 5G core network (5GC), an MBS system may be configured and operated without including the MBSF 122 and the MBSTF 121. When the MBSF 122 and the MBSTF 121 are not included, the AF 130 may request MBS service provision from the MB-SMF 112 directly or through the NEF 106. At this time, MBS data is provided to the 5G network through the MB-UPF 111 from an application server (AS) providing MBS or from a contents provider.

In the disclosure, the AF 130 may be an application server (AS) for providing a specific multicast/broadcast application service. Accordingly, hereinafter, the AS may be understood to be the same as the AF 130 or that AF 130 and AS exist together. The AF 130 may transmit a request for providing the MBS service to the UE 10 to the MBSF 122 to provide the MBS service. Then, the MBSF 122 may control the MBSTF 121, which is an MBS service media anchor in 5GS to transmit MBS service traffic to the UE 10, so that the MBS service is provided to the UE 10. In this case, the MBS service may refer to data according to a multicast/broadcast service received from a specific contents provider.

According to an embodiment, the MBSF 122 and the MBSTF 121 may be integrated into one entity or one NF. As another example, MBSF 122 may be integrated into NEF 106 or another NF. As another example, in 5GS, the AF 130 may directly request MBS service to MB-SMF 112 without MBSF 122 and MB STF 121, and the MB-UPF 111 may receive media from a content provider, which is the AS or AF 130, and forward traffic.

Through MBSF 122 and MBSTF 121, MBS service sessions are managed and service traffic is generated, and when service traffic is delivered to the UE 10 through multicast/broadcast, the corresponding traffic may be managed by allocating an MBS session. That is, the MBSF 122 may correspond to a control plane that manages MBS sessions, and the MBSTF 121 may correspond to a user plane that handles traffic.

Meanwhile, in the following description, the term "multimedia broadcast-multicast service gateway-control plane (MBMS-GW-C) service" collectively refers to a control function or service for generating an MBS context for the MBS PDU session, managing the MBS session, and delivering traffic of the MBS session to the NG-RAN 20 as a base station through IP multicast.

The MBMS-GW-C service may be integrated into the existing SMF 107 that manages a single PUD session (unicast PDU session) and configured as an SMF 112 having an MBS session control function, or may be configured as a separate NF. An NF supporting the MBMS-GW-C service and having the function of the existing SMF 107 is referred to as an MB-SMF 112 in the disclosure.

In addition, a service that delivers traffic received from the MB-UPF 111 according to the MBS context for the MBS PDU session to the NG-RAN 20 performing multicast/broadcast according to the MBMS-GW-C service through IP multicast may be referred to as a multimedia broadcast-multicast service gateway-user plane (MBMS-GW-U) service.

The MBMS-GW-U service may be integrated into the existing UPF 106 that handles a single PDU session and configured as a UPF with the ability to forward MBS traffic to the appropriate NG-RAN 20 as IP multicast, or may be configured as a separate NF as illustrated in FIG. 1. Therefore, in the following description, an NF that supports the MBMS-GW-U service and has the function of the existing UPF 107 may be referred to as an MB-UPF 111.

As described above, the MBMS-GW-C service uses the N4mb interface to control the MBMS-GW-U service.

In describing various embodiments in the present disclosure, for convenience, MBMS-GW-C and MBMS-GW-U are mainly described as SMF (106) and UPF (107) or MB-SMF (112) and MB-UPF (111), respectively, but if necessary, whether the use is dedicated to unicast or multicast/broadcast, or whether both are supported will be described together to avoid confusion.

The MBS traffic is delivered to NG-RANs 20 from MBMS-GW-U (or UPF 107 or MB-UPF 111). For example, the MBS traffic is delivered to the NG-RAN 20 using IP multicast. At this time, the tunnel between the MBMS-GW-U (or UPF 107 or MB-UPF 111) and the NG-RAN 20 is called a shared delivery tunnel or shared N3 tunnel. In the following description, for convenience of explanation, it may be referred to as a shared delivery tunnel or a shared tunnel.

To configure the M1 tunnel, the MBMS-GW-C (or SMF 106 or MB-SMF 112) may transmit a control message to the NG-RAN 20 through the AMF 101.

FIG. 2 illustrates a conventional process for waking up a terminal in an idle state in the process of activating a general unicast PDU session according to an embodiment of the present disclosure.

Referring to FIG. 2, in step 210, downlink data arrives at an UPF 205. In this case, when the terminal 201 stays in the idle state, the UPF may notify the SMF 204 that downlink data has been generated in step 220 to wake the terminal 201. In this case, the UPF 205 may transmit the data notification message to the SMF 204 along with the N4 session Id, including information on the quality of service (QoS) flow found for the received data (step 220). In step 223, the SMF 204 may transmit a response message according to data notification reception to the UPF 205 (e.g., data notification ack). In step 225, the UPF 205 may transmit downlink data to the SMF 204.

The SMF 204 receiving the data notification may transmit, in step 230, an ID of the terminal 201 that may receive the downlink data, for example, a subscription permanent identifier (SUPI), information for reference to paging the terminal 201, for example, PDU session ID and ARP (allocation and retention priority) corresponding to the downlink data, paging policy indicator and 5G QoS identifier (5QI) information, and the like to the AMF 203. The AMF 203 may transmit a response message to the SMF 204 (step 235). In case of a failure response, the SMF 204 may transmit a failure indication to the UPF 205 (step 237).

The AMF 203 may determine information for paging, for example, paging priority, paging discontinuous reception (DRX) length, etc., from information received from the SMF 204 in step 240, and may transmit to the NG-RAN 202 together with information such as 5G-S-TMSI (5G-S-temporary mobile subscriber identity), which is a temporary ID of the terminal 201. In step 245, the NG-RAN 202 may use the received information to paging the terminal 201 according to a paging strategy.

Meanwhile, the terminal 201 receiving the paging may perform a service request as in step 260 to generate a tunnel for transmitting downlink data to the terminal 201 as in steps 261 to 268, and allocate a radio resource in the NG-RAN 202.

Figure 3:
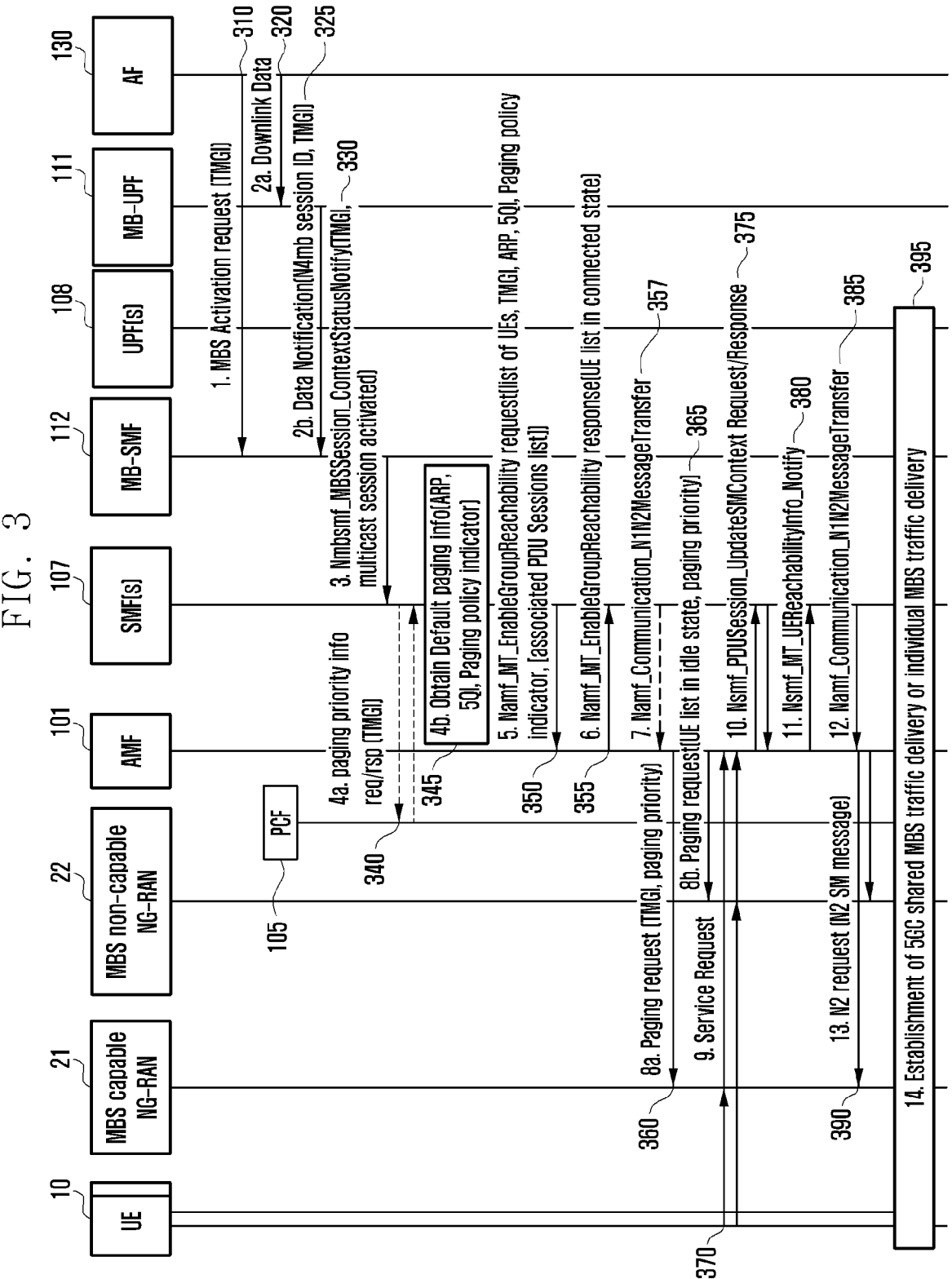
FIG. 3 illustrates a process for the SMF to configure paging priority information in a process of activating a multicast session and wake up a terminal in an idle state accordingly according to an embodiment of the present disclosure.

FIG. 3 illustrates a process for the SMF to configure paging priority information in a process of activating a multicast session and wake up a terminal in an idle state accordingly, according to an embodiment of the present disclosure.

Prior to referring to FIG. 3, each component of FIG. 3 will be described using the components of the mobile communication network according to the disclosure described in FIG. 1 described above.

In the following description, the UE 10, terminal, mobile terminal, etc. may be used interchangeably for the UE, but all may be understood as the UE 10 illustrated in FIG. 1.

Meanwhile, in FIG. 3 and FIG. 4 and FIG. 7 to be described later, base stations 21 with MBS functions and base stations 22 without MBS functions are distinguished and exemplified, and both may be included in the NG-RAN 20. The meaning of the base stations 21 with the MBS function and the base stations 22 without the MBS function may become clearer through the following description.

Referring to FIG. 3, as in step 310, the MB-SMF 112 may receive a request from the AF 130 to activate a corresponding multicast session provided by the AF 130. Alternatively, as in steps 320 and 325, a notification that data for a corresponding multicast session provided by the AF 130 has occurred may be received from the MB-UPF 111. Then, in step 330, the MB-SMF 112 may start a procedure for activating the corresponding multicast session.

In step 310, the AF 130 may transmit a session activation request to the MB-SMF 112 including information on the multicast session to be activated, that is, an MBS session ID or a temporary mobile group identity (TMGI). In addition, in step 320, when downlink data is generated from the AF 130, the MB-UPF 111 may detect the received data, detect which MBS session the data is for, and inform the MB-SMF 112 that data for the corresponding multicast session has occurred by delivering N4mb session ID information including the corresponding MBS session ID or TMGI information (step 325).

For reference, the process of activating a multicast session according to the embodiment differs from the case of activating a PDU session described in FIG. 2 as follows. For example, in general paging, even when the PDU session is inactive, the UPF may have information about the PDU session so that the UPF can detect the PDU session. However, when a multicast session is disabled, even when individual delivery is used, the UPF deletes the associated QoS flow(s) information connected to the multicast QoS flow of the corresponding multicast session and deletes the tunnel between the UPF and MB-UPF. Therefore, as shown in FIG. 2, the multicast session is activated in conjunction with the MB-SMF 112 instead of simply being activated through the SMF.

In step 330, the MB-SMF 112 may transmit an MBS session context status notification (Nmbsmf_MBSSession_ContextStatusNotify) message to the SMFs 107 serving the multicast session provided by the AF 130 to inform them that the multicast session needs to be activated. At this time, the MBS session context status notification message may include a TMGI to identify a terminal requiring activation of a multicast session, and may include a "multicast session activated" indication to notify that activation of a multicast session is required. The TMGI and "multicast session activated" indication may be included in the Nmbsmf_MBSSession_Context status notify message or transmitted together with the Nmbsmf_MBSSession_Context status notify message.

In addition, when there is a terminal receiving MBS only in an area that can be managed by one SMF 107, it can be one SMF 107. On the other hand, when a terminal receiving MBS is widely distributed in an area managed by a plurality of SMFs 107, a plurality of SMFs 107 may be provided. Therefore, in the following description, it is assumed that a terminal receiving an MBS is widely distributed in an area managed by a plurality of SMFs 107. However, it will be apparent to those skilled in the art that the present disclosure includes a case where a terminal receiving an MBS exists only in an area that can be managed by one SMF 107.

Upon receiving the Nmbsmf_MBSSession_Context status notify message, the SMF 107 may perform a process for waking up (wake-up or transition to active state) a terminal in an idle state so as to activate a multicast session.

In the disclosure, the TMGI may be used for two purposes. First, as information for identifying a session that provides a multicast service, the TMGI can be used as a multicast session ID or MBS session ID. Therefore, in the disclosure, TMGI can be used as information for notifying a multicast session to be activated.

Second, The TMGI may be used as information identifying a group of terminals that can receive a certain multicast service.

According to the above, the MB-SMF 112 may notify the SMFs 107 by including TMGI in the Nmbsmf_MB_SSession_Context status notify message as information for notifying the multicast session to be activated. Then, the SMF 107 may start an operation to wake up a terminal in an idle state so that terminals receiving a multicast session corresponding to TMGI among service terminals may receive the service, and when the base station has an awake terminal, the multicast session may be activated by generating a tunnel for the multicast session.

At this time, when there is no priority information for paging in the process of paging as an operation for waking up a terminal in an idle state, the SMF 107 may acquire priority information for paging from the PCF 105 in step 345. The priority information may include at least one of ARP, 5QI, or paging policy indicator. As for the priority information, the SMF 107 may store default paging info for the corresponding TMGI. Alternatively, the SMF 107 may request and receive priority information for the TMGI from the PCF 105 through step 340, and the SMF 107 may configure default paging info, based on the received value (step 345).

In the process of determining the basic value (default value) of priority information in the SMF 107 or PCF 105, in the case of performing MBS service through one multicast QoS flow for the MBS session, the default value of priority information may be determined by values of ARP, 5QI, and/or paging policy indicator assigned to a unicast QoS flow corresponding to the multicast QoS flow or associated with the multicast QoS flow. However, in the case of MBS service through several multicast QoS flows for the MBS session, the default value of priority information may be determined with the values of ARP, 5QI, and/or paging policy indicator assigned to the unicast QoS flow with the highest priority among the values of ARP, 5QI, and/or paging policy indicators assigned to unicast QoS flows corresponding to each multicast QoS flow or associated with the each multicast QoS flow.

The SMF 107 may identify terminals receiving MBS corresponding to the TMGI value. Accordingly, in step 350, the SMF 107 may transmit the serviced UE list and/or TMGI by including the first request message, TMGI, and the ARP, 5QI, paging policy indicator values, etc. as the priority information, for example, in the Namf_MT_EnableGroupReachability request message to the AMF 101 serving the corresponding terminals to enable the terminals receiving multicast sessions corresponding to TMGI to wake up from an idle state, thereby waking up the corresponding terminals. At this time, as the UE list may use the SUPI value of the UE 10, the list of 5G-GUTI values of the UE 10, or the list of 5G-S-TMSI values.

The AMF 101 may notify the SMF 107 that the UE is in a connected state through step 355 in the case of a UE in a connected state among the UE list received in the Namf_MT_EnableGroupReachability request message. In addition, since the AMF 101 can receive the Namf_MT_EnableGroupReachability request message from the plurality of SMFs 107, each SMF 107 may be notified that the corresponding terminal is in a connected state for a terminal in a connected state among the UE list received from each SMF 107.

In step 357, the SMF 107 may deliver information such as a PDU session ID, an MBS session ID, and a QoS profile for associated QoS flow(s) to the AMF 101 through the N2 SM container for the associated PDU session. The QoS profile for the associated QoS flow may be delivered to the AMF 101 through the N2 SM container for each associated PDU session. Alternatively, the SMF 107 may transmit the MBS session ID, the QoS profile for the associated QoS flow, and the ID list of the associated PDU session to the AMF 101 in the N2 SM container to share the QoS profile for the associated QoS flow(s) between associated PDU sessions corresponding to MBS sessions.

Meanwhile, according to the disclosure, for a terminal in an idle state, the AMF 101 may request paging from base stations 21 having MBS functions to perform paging to wake up the terminal 10 in step 360. For example, the AMF 101 may transmit a paging request message to base stations 21 having an MBS function among base stations corresponding to a paging area in a multicast service area. Here, a base station corresponding to a paging area in a multicast service area may be base station(s) including a terminal in an idle state among a plurality of base stations providing a multicast service. One or more base stations including the terminal in the idle state may be present, but in FIG. 3, it is shown as one base station in consideration of the complexity of the drawing. However, even in the case of two or more base stations, the operation of the base station shown in FIG. 3 may operate in the same way in all base stations having different MBS functions and receiving a paging request message including TMGI. In the following description, a plurality of base stations will be represented and described as one base station.

As in step 360, the AMF 101 may transmit a paging request message including TMGI information to the base station 21 having the MBS function to enable the base station 21 having the MBS function to perform group paging according to the TMGI information. Therefore, the base station 21 having the MBS function may transmit a paging signal to a group of corresponding terminals using the TMGI information included in the paging request message received in step 360 (transmission of the paging signal is not shown in the figure). That is, by transmitting a paging signal from the base station 21 having the MBS function, terminals using a multicast service corresponding to TMGI may recognize that the terminals need to wake up.

However, since the base station 22 without the MBS function cannot process TMGI information, the AMF 101 may transmit the 5G-S-TMSI for the terminals in the idle state to the base station 22 without the MBS function as in step 365, and the base station 22 without an MBS function may request individual paging for each terminal using the 5G-S-TMSI.

In steps 360 and 365, the paging request message delivered by the AMF 101 to the base stations 21 and 22 may include not only TMGI or 5G-S-TMSI to indicate target terminals, but also a paging priority value. The AMF 101 may refer to the default value of priority information received from the SMF 107, that is, values such as ARP, 5QI, and/or paging policy indicator, and according to the operator's policy to configure the paging priority high when sensitivity to delay is high or when importance is high, such as public safety or mission critical push to talk (MCPTT). Alternatively, the AMF 101 may configure a relatively higher paging priority than general paging for group paging based on TMGI, and configure a relatively high paging priority in cases of high importance such as public safety or MCPTT.

Accordingly, when the base stations 21 and 22 receiving the paging request from the AMF 101 receive the paging priority, the base stations 21 and 22 may perform paging by referring to the paging priority. If the paging priority is not included in the paging request, the base stations 21 and 22 may apply the default paging priority value according to the operator's policy. In addition, according to an embodiment, a default paging priority value for individual paging and a default paging priority value for group paging may be configured differently, so that, for example, a relatively high paging priority may be applied to group paging.

The terminal 10 having recognized that the terminal needs to wake up through group paging or individual paging may perform a service request process in step 370. In FIG. 3, the service request process may be a procedure in which the UE 10 transmits a service request message to the AMF 101 through the base stations 21 or 22. In FIG. 3, as described above, when the UE 10 receives a group paging message from the base stations 21 having the MBS function, a service request message may be transmitted to the AMF 101 through the base station 21 having the MBS function. On the other hand, when the UE 10 receives an individual paging message from the base stations 22 without the MBS function, the UE 10 may transmit a service request message to the AMF 101 through the base stations 22 without the MBS function.

In addition, as described above, only one UE 10 is exemplified as a representative of the UE receiving the MBS. Therefore, terminals responding to individual paging may be one or more terminals. In the case of two or more terminals, as illustrated in FIG. 3, a service request message can be transmitted to the AMF 101 through the base station 22 without MBS function that has transmitted a paging signal to itself. In addition, in step 370 of FIG. 3, terminals responding to group paging and terminals responding to individual paging may be different terminals. It should be noted that in the drawing of FIG. 3, it is illustrated for simplification because the drawing becomes very complicated when terminals responding to group paging and terminals responding to individual paging are separately exemplified.

According to the embodiment, in step 375, the AMF 101 transmits the Nsmf_PDUSession_UpdateSMContext request message to support the PDU session by providing SM information to the SMF 107, and may receive an Nsmf_PDUSession_UpdateSMContext response message including SM information from the SMF 107 as a response thereto.

Accordingly, the AMF 101 receiving the service request message through the base stations 21 with the MBS function and/or through the base stations 22 without the MBS function may recognize that the terminals 10 that sent the service request message are awake, and may transmit a list of awakened terminals 10 to the corresponding SMF 107 in step 380. At this time, the list of awakened terminals 10 may be transmitted using a reachability notification message.

The SMF 107 may configure a multicast session corresponding to the list of awakened terminals 10, and may notify the AMF 101 that the multicast session has been activated in step 385. The AMF 101 that has recognized that the multicast session for the MB S to be provided to the terminal 10 is activated may inform the corresponding base stations 21 and 22 by transmitting an N2 SM message in step 390. The N2 SM message may include a TMGI value so that the terminals 10 serving the multicast session corresponding to the TMGI can consider resources for the multicast service.

In step 395, a shared tunnel or an individual tunnel for transmitting multicast traffic between the UE 10 and the UPF 108 may be set up. When the UE 10 uses the base stations 21 having the MBS function, a shared tunnel may be set up, and when the UE 10 uses the base stations 22 without the MBS function, an individual tunnel may be set up.

Figure 4:
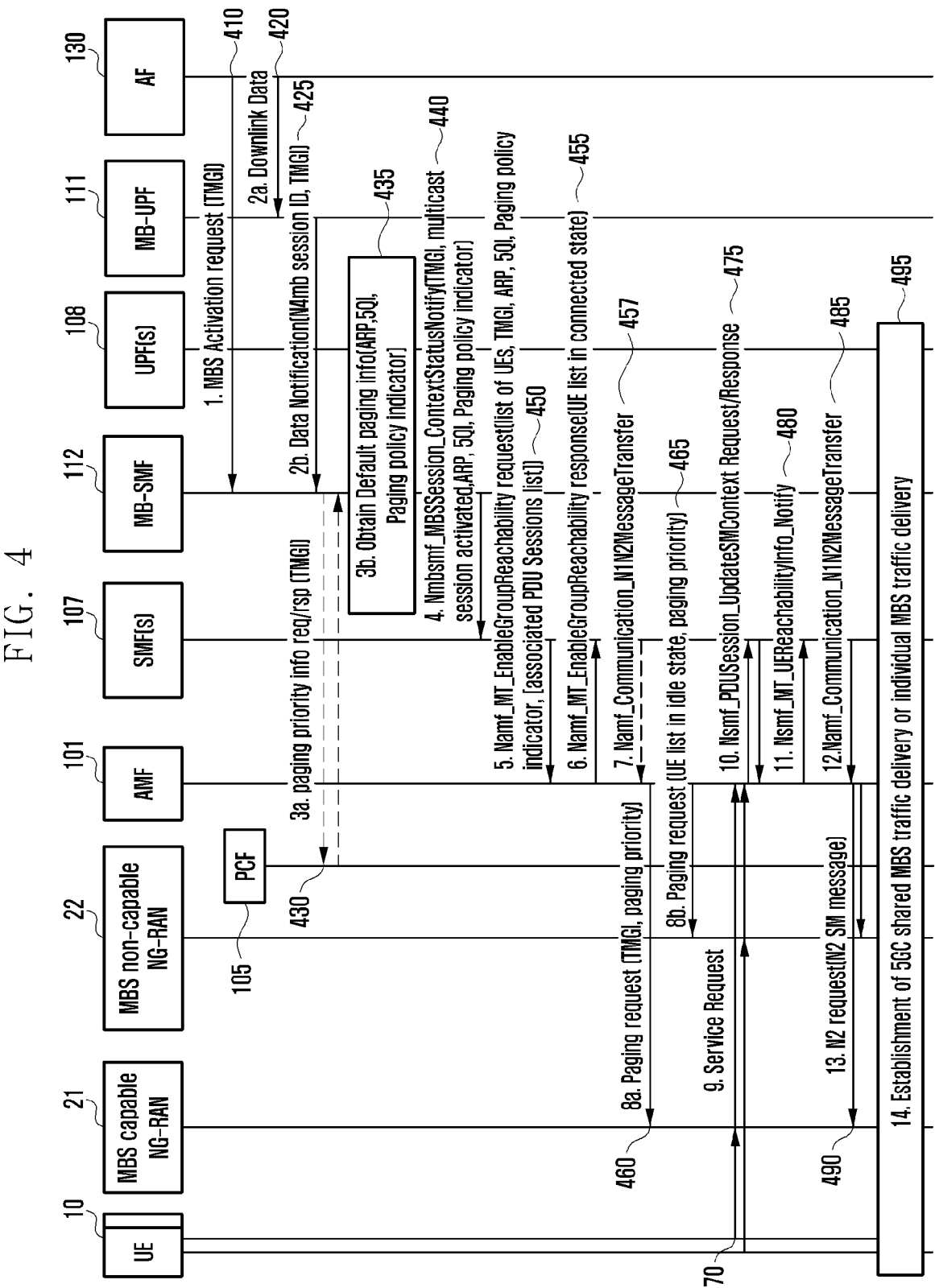
FIG. 4 illustrates a process for the MB-SMF to configure paging priority information and wake up a terminal in an idle state according to the paging priority information in the process of activating a multicast session according to an embodiment of the present disclosure.

FIG. 4 illustrates a process for the MB-SMF to configure paging priority information and wake up a terminal in an idle state according to the paging priority information in the process of activating a multicast session according to an embodiment of the disclosure.

Prior to referring to FIG. 4, each component of FIG. 4 will be described using the components of the mobile communication network according to the disclosure described in FIG. 1 described above.

In the following description, the UE 10, terminal, mobile terminal, etc. may be used interchangeably for the UE, but all may be understood as the UE 10 illustrated in FIG. 1.

Referring to FIG. 4, in step 410, the MB-SMF 112 may receive a request from the AF 130 to activate a corresponding multicast session provided by the AF 130. Alternatively, as in steps 420 and 425, a notification that data for a corresponding multicast session provided by the AF 130 has occurred may be received from the MB-UPF 111. Thereafter, in step 430, the MB-SMF 112 may start a procedure for activating the corresponding multicast session.

In step 410, the AF 130 may transmit a session activation request to the MB-SMF 112 including information on the multicast session to be activated, that is, MBS session ID or TMGI. In addition, in step 420, when downlink data is generated from the AF 130, the MB-UPF 111 may detect the received data, detect which MBS session data it is for, and forward the same to the MB-SMF 112 to inform the MB-SMF 112 that data for the corresponding multicast session has occurred by transmitting the N4mb session ID information including the corresponding MBS session ID or TMGI information along with N4mb session ID information, to the MB-SMF 112 (step 425).

For reference, the process of activating a multicast session in this embodiment differs from the case of activating a PDU session described in FIG. 2 as follows. For example, in general paging, even when the PDU session is inactive, the UPF may have information about the PDU session so that the UPF can detect the PDU session. However, in the case of a multicast session, if the multicast session is disabled, even when individual delivery is used, the UPF deletes the associated QoS flow(s) information connected to the multicast QoS flow of the corresponding multicast session and deletes the tunnel between the UPF and MB-UPF. Therefore, as shown in FIG. 2, the multicast session is activated in conjunction with the MB-SMF 112 instead of simply being activated through the SMF.

If activation is required for the multicast session through steps 410, 420, and 425, the MB-SMF 112 may acquire priority information for paging through step 435. The priority information may include ARP, 5QI, and/or paging policy indicator. As for the priority information, the MB-SMF 112 may store default paging info for the corresponding TMGI. Alternatively, the MB-SMF 112 may request and receive priority information for the TMGI from the PCF 105 through step 430, and the MB-SMF 112 may configure default paging info based on the received value (step 435).

In the process of determining the basic value of priority information in the MB-SMF 112 or PCF 105, when the MBS service is performed through one multicast QoS flow for the MBS session, the default value of priority information may be determined with the value of ARP, 5QI, and/or paging policy indicator assigned to the corresponding multicast QoS flow. However, in the case of MBS service through several multicast QoS flows for the MBS session, the default value of priority information may be determined with the value of the ARP, 5QI, and/or paging policy indicator having the highest priority among the ARP, 5QI, and/or paging policy indicator values assigned to each multicast QoS flow.

In step 440, the MB-SMF 112 may transmit an MBS session context status notification (Nmbsmf_MBSSession_ContextStatusNotify) message to the SMF s 107 serving the multicast session provided by the AF 130 to notify that the multicast session needs to be activated. At this time, the MBS session context status notification message may include a TMGI to identify a terminal requiring activation of a multicast session, and may include a "multicast session activated" indication to notify that activation of a multicast session is required. In addition, the MBS session context status notification message may include the default value of priority information for the paging, for example, ARP, 5QI, and/or a paging policy indicator.

The TMGI, "multicast session activated" indication, and default value of priority information for paging may be included in the Nmbsmf_MBSSession_Context status notify message or transmitted together with the Nmbsmf_MBSSession_Context status notify message. In addition, when there is a terminal receiving MBS only in an area that can be managed by one SMF 107, one SMF 107 may be provided. On the other hand, when a terminal receiving MBS is widely distributed in an area managed by a plurality of SMFs 107, a plurality of SMFs 107 may be provided. Therefore, in the following description, it is assumed that a terminal receiving an MBS is widely distributed in an area managed by a plurality of SMFs 107. However, it will be apparent to those skilled in the art that the present disclosure includes a case where a terminal receiving an MBS exists only in an area that can be managed by one SMF 107.

Upon receiving the Nmbsmf_MBSSession_Context status notify message, the SMF 107 may perform a process for waking up (wake-up or transition to active state) a terminal in an idle state so as to activate a multicast session.

According to the above, the MB-SMF 112 may inform the SMFs 107 of the multicast session to be activated by including the TMGI and the default paging priority information in the Nmbsmf_MBSSession_Context status notify message as information for notifying the multicast session to be activated. Then, the SMF 107 may start an operation to wake up a terminal in an idle state so that terminals receiving a multicast session corresponding to TMGI among service terminals may receive the service, and may activate the multicast session by creating a tunnel for the multicast session for the base station where the awake terminal is located.

The SMF 107 may identify terminals receiving MBS corresponding to the TMGI value. Accordingly, in step 450, the SMF 107 may transmit the serviced UE list and/or TMGI by including the first request message, TMGI, and the ARP, 5QI, paging policy indicator values, etc. as the priority information, for example, in the Namf_MT_EnableGroupReachability request message to the AMF 101 serving the corresponding terminals to enable the terminals receiving multicast sessions corresponding to TMGI to wake up from an idle state, thereby waking up the corresponding terminals. At this time, as the UE list, a SUPI value of the UE 10 or a list of 5G-GUTI values of the UE 10 or a list of 5G-S-TMSI values may be used.

The AMF 101 may notify the SMF 107 that the AMF is in a connected state through step 455 for a terminal in a connected state among the UE list received in the Namf_MT_EnableGroupReachability request message. In addition, since the AMF 101 can receive the Namf_MT_EnableGroupReachability request message from the plurality of SMFs 107, the AMF 101 may inform each SMF 107 that the corresponding terminal is in a connected state for a terminal in a connected state among the UE list received from each SMF 107.

In step 457, the SMF 107 may deliver information such as a PDU session ID, an MBS session ID, and a QoS profile for associated QoS flow(s) to the AMF 101 through the N2 SM container for the associated PDU session. The QoS profile for the associated QoS flow may be delivered to the AMF 101 through the N2 SM container for each associated PDU session. Alternatively, the SMF 107 may deliver the QoS profile for the associated QoS flow(s) to the AMF 101 by including the MBS session ID, the QoS profile for the associated QoS flow, and the ID list of the associated PDU session in the N2 SM Container to be shared between associated PDU sessions corresponding to MBS sessions.

Meanwhile, according to the disclosure, for a terminal in an idle state, the AMF 101 may request paging from base stations 21 having MBS functions to perform paging to wake up the terminal 10 in step 460. For example, the AMF 101 may transmit a paging request message to base stations 21 having an MBS function among base stations corresponding to a paging area in a multicast service area. Here, the base station corresponding to the paging area in the multicast service area may be base station(s) including a terminal in an idle state among a plurality of base stations providing a multicast service. One or more base stations including the terminal in the idle state may be present, but in FIG. 4, it is illustrated as one base station in consideration of the complexity of the drawing. However, even in the case of two or more base stations, the operation of the base station shown in FIG. 4 can operate in the same way in all base stations having different MBS functions and receiving a paging request message including TMGI. In the following description, a plurality of base stations will be represented and described as one base station.

As in step 460, the AMF 101 may transmit a paging request message including TMGI information to the base station 21 having the MBS function, so that the base station 21 having the MBS function performs group paging according to the TMGI information. Therefore, the base station 21 having the MBS function may transmit a paging signal to a group of corresponding terminals using the TMGI information included in the paging request message received in step 460 (transmission of the paging signal is not shown in the drawing). That is, by transmitting the paging signal from the base station 21 having the MBS function, the terminals using a multicast service corresponding to TMGI may recognize that the terminals need to wake up.

However, since the base station 22 without the MBS function cannot process TMGI information, the AMF 101 may transmit the 5G-S-TMSI for the terminals in the idle state to the base station 22 without the MBS function as in step 465, and a base station 22 without an MBS function may request individual paging for each terminal using the 5G-S-TMSI.

The paging request message delivered by the AMF 101 to the base stations 21 and 22 in steps 460 and 465 may include not only TMGI or 5G-S-TMSI to indicate target terminals, but also a paging priority value. The AMF 101 may refer to the default value of priority information received from the SMF 107, that is, values such as ARP, 5QI, or paging policy indicator, and may configure the paging priority high when the sensitivity to delay is high according to the operator's policy or when the importance is high, such as public safety or MCPTT. Alternatively, the AMF 101 may configure a relatively higher paging priority than general paging for group paging, based on TMGI, and configure a relatively high paging priority in cases of high importance such as public safety or MCPTT.

Accordingly, when the base stations 21 and 22 receiving the paging request from the AMF 101 receive the paging priority, the base stations 21 and 22 may perform paging by referring to the paging priority. When the paging priority is not included in the paging request, the base stations 21 and 22 may apply the default paging priority value according to the operator's policy. Also, according to an embodiment, a default paging priority value for individual paging and a default paging priority value for group paging may be configured differently, so that, for example, a relatively high paging priority may be applied to group paging.

The terminal 10 having recognized that the terminal needs to wake up through group paging or individual paging may perform a service request process in step 470. In FIG. 4, the service request process may be a procedure in which the UE 10 transmits a service request message to the AMF 101 through the base stations 21 or 22. In FIG. 4, as described above, when the UE 10 receives a group paging message from the base stations 21 having the MBS function, a service request message may be transmitted to the AMF 101 through the base station 21 having the MBS function. On the other hand, when the UE 10 receives an individual paging message from the base stations 22 without the MBS function, the UE 10 may transmit a service request message to the AMF 101 through the base stations 22 without the MBS function.

In addition, as described above, only one UE 10 is exemplified as a representative of the UE receiving the MBS. Therefore, terminals responding to individual paging may be one or more terminals. In the case of two or more terminals, as illustrated in FIG. 4, a service request message may be transmitted to the AMF 101 through the base station 22 having no MBS function that has transmitted a paging signal to itself. In addition, in step 470 of FIG. 4, terminals responding to group paging and terminals responding to individual paging may be different terminals. It should be noted that, in the case of separately illustrating terminals that respond to group paging and terminals that respond to individual paging in the drawing of FIG. 4, the drawing is illustrated for simplicity because the drawing becomes very complicated.

According to an embodiment, in step 475, the AMF 101 may transmit the Nsmf_PDUSession_UpdateSMContext Request message to support the PDU session by providing SM information to the SMF 107, and receive an Nsmf_P-DUSession_UpdateSMContext response message including SM information from SMF 107 as a response thereto.

Accordingly, the AMF 101 receiving the service request message through the base stations 21 with the MBS function and/or the base stations 22 without the MBS function may recognize that the terminals 10 that sent the service request message are awake, and transmit a list of awakened terminals 10 to the corresponding SMF 107 in step 480. At this time, the list of awakened terminals 10 may be transmitted using a reachability notification message.

The SMF 107 may configure a multicast session corresponding to the list of awakened terminals 10 and notify the AMF 101 that the multicast session has been activated in step 485. The AMF 101 recognizing that the multicast session for the MBS to be provided to the terminal 10 is activated may notify the corresponding base stations 21 and 22 by transmitting an N2 SM message in step 490. The N2 SM message may include a TMGI value so that terminals 10 serving multicast sessions corresponding to the TMGI may consider resources for multicast service.

In step 495, a shared tunnel or an individual tunnel for transmitting multicast traffic between the UE 10 and the UPF 108 may be set up. When the UE 10 uses the base stations 21 having the MBS function, a shared tunnel may be set up, and when the UE 10 uses the base stations 22 without the MBS function, an individual tunnel may be set up.

Figure 5:
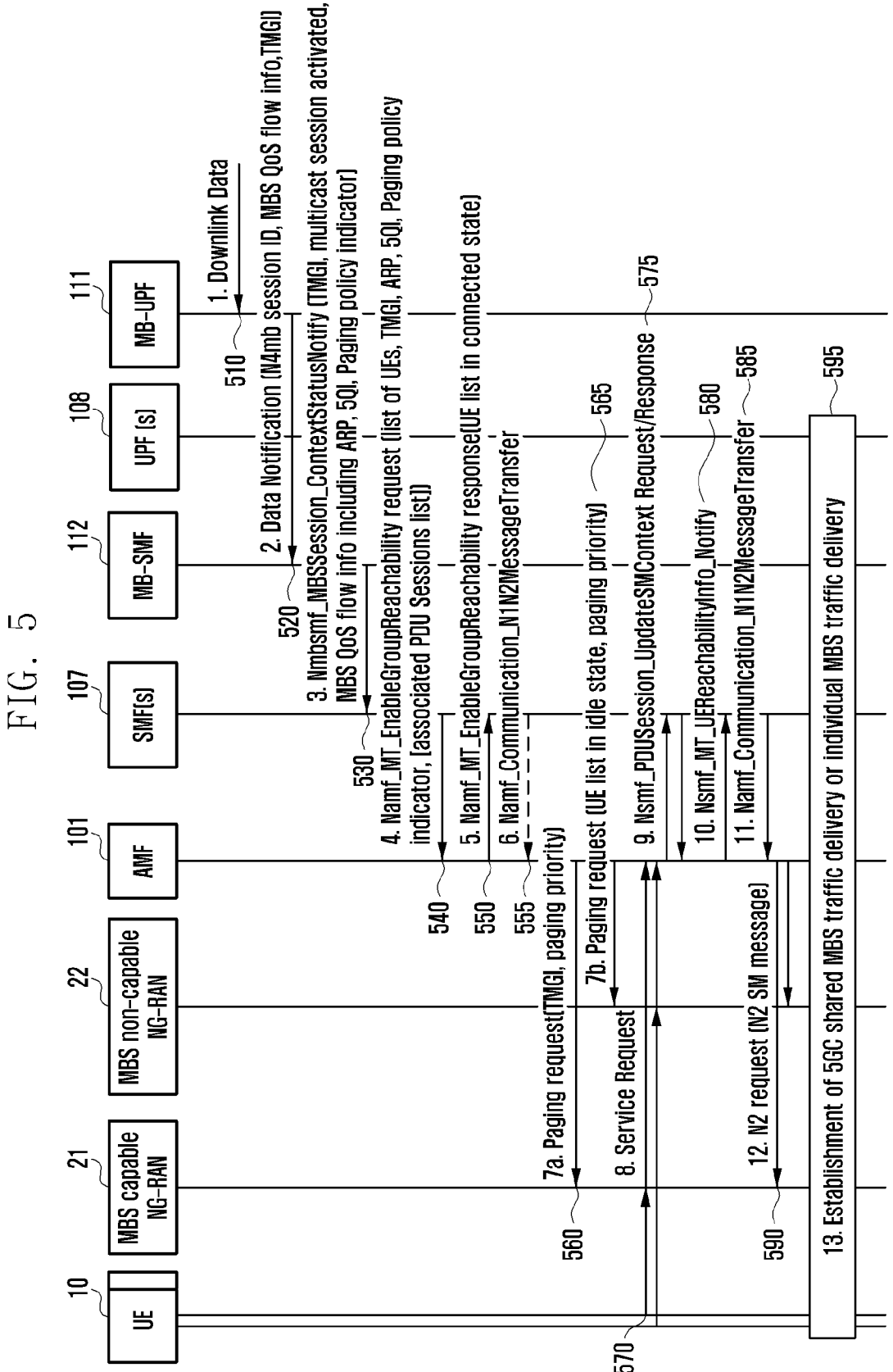
FIG. 5 illustrates a process of configuring paging priority information in a process of activating a multicast session according to generation of downlink data and waking up a terminal in an idle state accordingly according to an embodiment of the present disclosure.

FIG. 5 illustrates a process of configuring paging priority information in a process of activating a multicast session according to generation of downlink data and waking up a terminal in an idle state accordingly according to an embodiment of the present disclosure.

Prior to referring to FIG. 5, each component of FIG. 5 will be described using the components of the mobile communication network according to the present disclosure described in FIG. 1 described above.

In the following description, the UE 10, terminal, mobile terminal, etc. may be used interchangeably for the UE, but all may be understood as the UE 10 illustrated in FIG. 1.

Referring to FIG. 5, when downlink data occurs as in step 510, the MB-UPF 111 may detect the received data to discriminate which multicast session, data corresponding to which multicast QoS flow, traffic for which multicast session, and which multicast QoS flow corresponds through source IP address and port information or application ID information, etc. If the MB-UPF 111 finds that the multicast session corresponding to the received data is deactivated, as in step 520, the MB-UPF 111 may transmit a notification that data for the deactivated multicast session has occurred to the MB-SMF 112 through a data notification message. In this case, the data notification message may include some or all of N4mb session ID, MBS session ID or TMGI mapped to the received data, and multicast QoS flow information, for example, 5QI for the multicast QoS flow.

Upon receiving the data notification, the MB-SMF 112 may recognize that data for the inactive multicast session has occurred, and initiate a procedure for activating the multicast session.

For reference, the process of activating a multicast session according to the present embodiment differs from the case of activating a PDU session described in FIG. 2 as follows. For example, in general paging, even when the PDU session is inactive, the UPF may have information about the PDU session so that the UPF may detect the PDU session. However, in the case of a multicast session, if the multicast session is disabled, even if individual delivery is used, the UPF deletes the associated QoS flow(s) information connected to the multicast QoS flow of the corresponding multicast session and deletes the tunnel between the UPF and MB-UPF. Therefore, as shown in FIG. 2, the multicast session is activated in conjunction with the MB-SMF 112 instead of being activated only through the SMF.

If activation is required for the multicast session through steps 510 and 520, the MB-SMF 112 may acquire a corresponding QoS profile from information on multicast QoS flows such as the received 5QI. For example, the MB-SMF 112 may obtain ARP and/or paging policy indicator information. The ARP, 5QI, and/or paging policy indicators may be used as priority information values for paging.

If another data notification occurs for the MBS session, the MB-SMF 112 may configure the priority information value to the value of ARP, 5QI, and/or paging policy indicator having the highest priority among the values of ARP, 5QI, and/or paging policy indicators assigned to each multicast QoS flow, among several multicast QoS flows notified in the notification.

In step 530, the MB-SMF 112 may transmit an MBS session context status notification (Nmbsmf_MBS_Session_ContextStatusNotify) message to the SMFs 107 serving the multicast session provided by the AF 130 to inform them that the multicast session needs to be activated. At this time, the MBS session context status notification message may include a TMGI to identify a terminal requiring activation of a multicast session, and may include a "multicast session activated" indication to notify that activation of a multicast session is required. In addition, the MBS session context state notification message may include a priority information value for the paging, for example, ARP, 5QI, and/or a paging policy indicator.

The TMGI, "multicast session activated" indication, and priority information values for paging may be included in the Nmbsmf_MBS_Session_Context status notify message or transmitted together with the Nmbsmf_MBSSession_Context status notify message. In addition, when there is a terminal receiving MBS only in an area that can be managed by one SMF 107, one SMF 107 may be provided. On the other hand, when a terminal receiving MBS is widely distributed in an area managed by a plurality of SMFs 107, a plurality of SMFs 107 may be provided. Therefore, in the following description, it is assumed that the terminal receiving the MBS is widely distributed in the area managed by the plurality of SMFs 107. However, it will be apparent to those skilled in the art that the present disclosure includes a case where a terminal receiving an MBS exists only in an area that can be managed by one SMF 107.

Upon receiving the Nmbsmf_MB_SSession_Context status notify message, the SMF 107 may perform a process for waking up (wake-up or transition to active state) a terminal in an idle state so as to activate a multicast session.

According to the above, the MB-SMF 112 may inform the SMFs 107 of the multicast session to be activated by including the TMGI and the default paging priority information in the Nmbsmf_MB_SSession_Context status notify message as information for notifying the multicast session to be activated. Then, the SMF 107 may start an operation to wake up a terminal in an idle state so that the terminals receiving a multicast session corresponding to the TMGI among service terminals can receive the service, and activate the multicast session by generating a tunnel for the multicast session for the base station where the awake terminal is located.

The SMF 107 may identify terminals receiving MBS corresponding to the TMGI value. Accordingly, in step 540, the SMF 107 may transmit the serviced UE list and/or TMGI by including the first request message, TMGI, and the ARP, 5QI, paging policy indicator values, etc. as the priority information, for example, in the Namf_MT_EnableGroupReachability request message to the AMF 101 serving the corresponding terminals to enable the terminals receiving multicast sessions corresponding to TMGI to wake up from an idle state, thereby waking up the corresponding terminals. In this case, as the UE list, the SUPI value of the UE 10, the list of 5G-GUTI values of the UE 10, or the list of 5G-S-TMSI values may be used.

The AMF 101 may notify the SMF 107 that the UE is in a connected state through step 550 in the case of a UE in a connected state among the UE list received in the Namf_MT_EnableGroupReachability request message. In addition, since the AMF 101 can receive the Namf_MT_EnableGroupReachability request message from the plurality of SMFs 107, the AMF 101 may inform each SMF 107 that the corresponding terminal is in a connected state for a terminal in a connected state among the UE list received from each SMF 107.

In step 550, the SMF 107 may deliver information such as a PDU session ID, an MBS session ID, and a QoS profile for associated QoS flow(s) to the AM 101F through the N2 SM container for the associated PDU session. The QoS profile for the associated QoS flow may be delivered to the AMF 101 through the N2 SM container for each associated PDU session. Alternatively, the SMF 107 may transmit the MBS session ID, QoS profile for the associated QoS flow, and ID list of the associated PDU session to the AMF 101 in the N2 SM Container so that the QoS profile for the associated QoS flow(s) is shared between associated PDU sessions corresponding to MBS sessions.

Meanwhile, according to the present disclosure, for a terminal in an idle state, the AMF 101 may request paging from base stations 21 having MBS functions to perform paging to wake up the terminal 10 in step 560. For example, the AMF 101 may transmit a paging request message to base stations 21 having an MBS function among base stations corresponding to a paging area in a multicast service area. Here, the base station corresponding to the paging area in the multicast service area may be base station(s) including a terminal in an idle state among a plurality of base stations providing a multicast service. One or more base stations including the terminal in the idle state may be present, but in FIG. 5, it is shown as one base station in consideration of the complexity of the drawing. However, even in the case of two or more base stations, the operation of the base station shown in FIG. 5 can operate in the same way in all base stations having different MBS functions and receiving a paging request message including TMGI. In the following description, a plurality of base stations will be represented and described as one base station.

As in step 560, the AMF 101 may transmit a paging request message including TMGI information to the base station 21 having the MBS function, so that the base station 21 having the MBS function performs group paging according to the TMGI information. Therefore, the base station 21 having the MBS function may transmit a paging signal to a group of corresponding terminals using the TMGI information included in the paging request message received in step 560 (transmission of the paging signal is not shown in the drawing). That is, by transmitting a paging signal from the base station 21 having the MBS function, terminals using a multicast service corresponding to TMGI may recognize that the terminals need to wake up.

However, since the base station 22 without the MBS function cannot process TMGI information, the AMF 101 may transmit the 5G-S-TMSI for the terminals in the idle state to the base station 22 without the MBS function as in step 565, and the base station 22 without an MBS function may request individual paging for each terminal using the 5G-S-TMSI.

The paging request message delivered by the AMF 101 to the base stations 21 and 22 in steps 560 and 565 may include not only TMGI or 5G-S-TMSI to indicate target terminals, but also a paging priority value. The AMF 101 may configure the paging priority high when sensitivity to delay is high or when importance is high, such as public safety or MCPTT according to the operator's policy by referring to the default value of priority information received from the SMF 107, that is, the value of ARP, 5QI, paging policy indicator, etc. Alternatively, the AMF 101 may configure a relatively higher paging priority than general paging for group paging, based on TMGI, and configure a relatively high paging priority in cases of high importance such as public safety or MCPTT.

Accordingly, when receiving the paging request from the AMF 101 receive the paging priority, the base stations 21 and 22 may perform paging by referring to the paging priority. If the paging priority is not included in the paging request, the base stations 21 and 22 may apply the default value of the paging priority according to the operator's policy. Also, according to embodiments, a default paging priority value for individual paging and a default paging priority value for group paging may be configured differently, so that, for example, a relatively high paging priority may be applied to group paging.

The terminal 10 having recognized that the terminal needs to wake up through group paging or individual paging may perform a service request process in step 570. In FIG. 5, the service request process may be a procedure in which the UE

10 transmits a service request message to the AMF 101 through the base stations 21 or 22. In FIG. 5, as described above, when the UE 10 receives a group paging message from the base stations 21 having the MBS function, a service request message may be transmitted to the AMF 101 through the base station 21 having the MBS function. On the other hand, when receiving an individual paging message from the base stations 22 without the MBS function, the UE 10 may transmit a service request message to the AMF 101 through the base stations 22 without the MBS function.

In addition, as described above, only one UE 10 is exemplified as a representative of the UE receiving the MBS. Therefore, terminals responding to individual paging may be one or more terminals. In the case of two or more terminals, as illustrated in FIG. 5, a service request message may be transmitted to the AMF 101 through the base station 22 without MBS function that has transmitted a paging signal to itself. In addition, in step 570 of FIG. 5, the terminals responding to group paging and the terminals responding to individual paging may be different terminals. It should be noted that in the drawing of FIG. 5, this is illustrated for simplification because the drawing becomes very complicated when terminals responding to group paging and terminals responding to individual paging are separately exemplified.

According to the embodiment, in step 575, the AMF 101 may transmit the Nsmf_PDUSession_UpdateSMContext Request message to support the PDU session by providing SM information to the SMF 107, and receive an Nsmf_PDUSession_UpdateSMContext response message including SM information from SMF 107 as a response thereto.

Accordingly, the AMF 101 receiving the service request message through the base stations 21 with the MBS function and/or the base stations 22 without the MBS function may recognize that the terminals 10 that have sent the service request message are awake, and transmit a list of awakened terminals 10 to the corresponding SMF 107 in step 580. In this case, the list of awakened terminals 10 may be transmitted using a reachability notification message.

The SMF 107 may generate a multicast session corresponding to the list of awakened terminals 10 and notify the AMF 101 that the multicast session has been activated in step 585. The AMF 101 that has recognized that the multicast session for the MBS to be provided to the terminal 10 is activated may notify the corresponding base stations 21 and 22 by transmitting an N2 SM message in step 590. The N2 SM message may include a TMGI value so that terminals 10 serving multicast sessions corresponding to the TMGI may consider resources for multicast service.

In step 595, a shared tunnel or an individual tunnel for transmitting multicast traffic between the UE 10 and the UPF 108 may be set up. When the UE 10 uses the base stations 21 having the MBS function, a shared tunnel may be set up, and when the UE 10 uses the base stations 22 without the MBS function, an individual tunnel may be set up.

Figure 6:
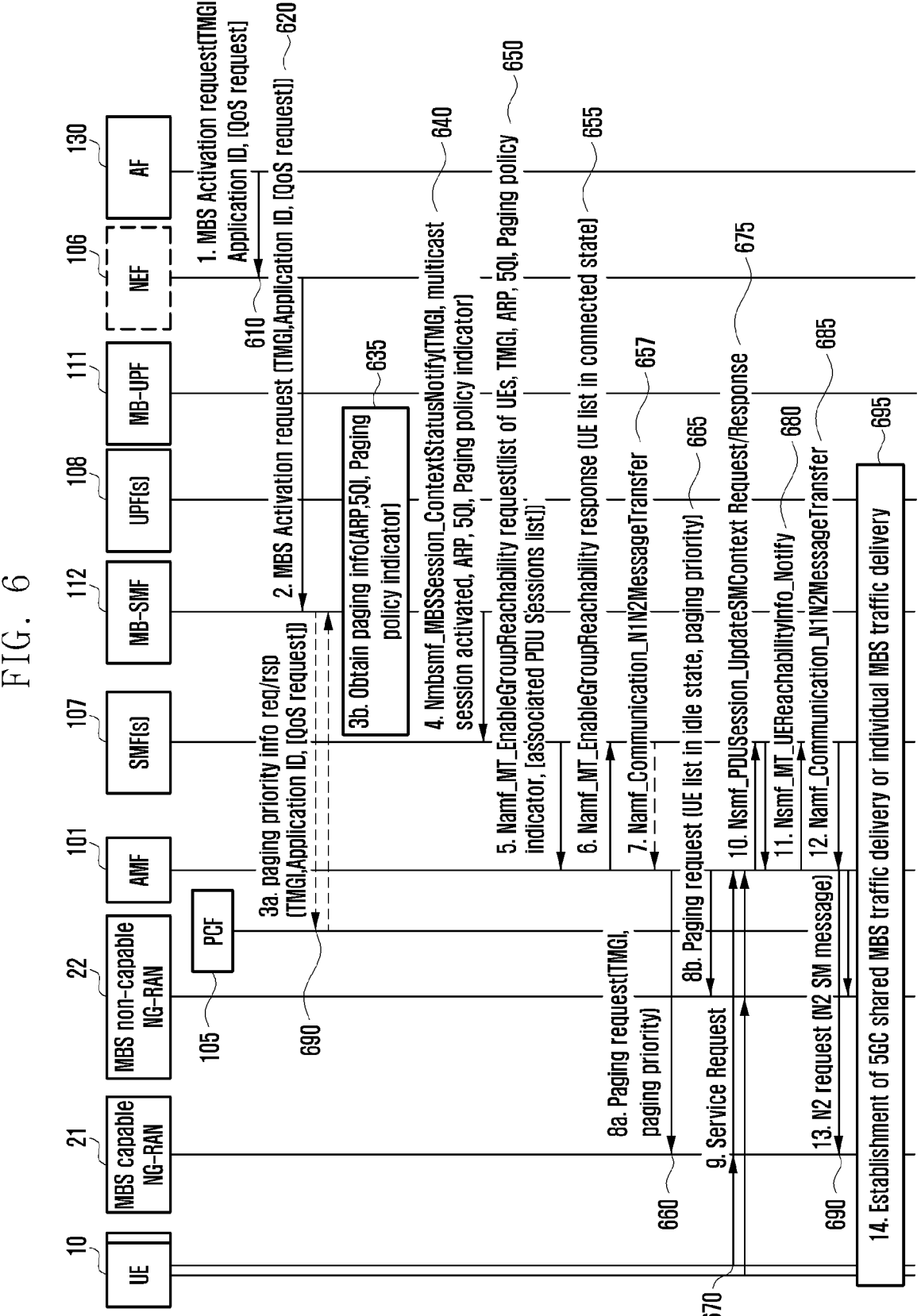
FIG. 6 illustrates a process of configuring paging priority information and waking up a terminal in an idle state according to the process of activating a multicast session upon request by an AF according to an embodiment of the present disclosure.

FIG. 6 illustrates a process of configuring paging priority information and waking up a terminal in an idle state according to the process of activating a multicast session upon request by an AF according to an embodiment of the present disclosure.

Prior to referring to FIG. 6, each component of FIG. 6 will be described using the components of the mobile communication network according to the disclosure described in FIG. 1 described above.

In the following description, a UE 10, terminal, mobile terminal, etc. may be used interchangeably for the UE, but all may be understood as the UE 10 illustrated in FIG. 1.

Meanwhile, in FIG. 6, a base stations 21 with the MBS function and a base stations 22 without the MBS function are distinguished and exemplified, and both may be included in the NG-RAN 20. The meaning of the base stations 21 with the MBS function and the base stations 22 without the MBS function may become clearer through the following description.

Referring to FIG. 6, an AF 130 may directly request the 5G system to activate the multicast session. If the AF 130 is outside the trust domain of the 5G system, the AF 130 may transmit an MBS activation request message to activate the multicast session to the MB-SMF 112 through the NEF 106 as in steps 610 and 620. If the AF 130 is within the trust domain of the 5G system, the AF 130 may directly transmit the MBS activation request message to the MB-SMF 112. The MBS activation request message may include an MBS session ID or TMGI to specify which MBS session it is for. In addition, the MBS activation request message may include an application ID serving through a multicast session to notify which QoS flow(s) corresponding to which service flow(s) may activate the session. In addition, the MBS activation request message may include QoS request information about which QoS service is desired to be received while activating the session. The QoS request information may include a 5QI value or a maximum bit rate value.

The MB-SMF 112 that has received the activation request may acquire priority information for paging through step 635 in order to activate the corresponding multicast session. The priority information may include ARP, 5QI, and/or paging policy indicator.

Even if the application ID is not included in the request message in step 620, the MB-SMF 112 that has received the activation request may store the application ID acquired from the AF 130 through the MBS session generation process or the IP address and port information of the AF and the mapping value for the multicast QoS flow(s) provided through the MBS session to find the stored value and mapped application ID, multicast QoS flow(s) information, and QoS profile, for example, the ARP, 5QI, and/or paging policy indicator values when the AF 130 requests activation. Alternatively, when the application ID is included in the request message in step 620, the MB-SMF 112 may find multicast QoS flow(s) information mapped to the corresponding application ID and QoS profile, for example, the ARP, 5QI, and/or paging policy indicator values.

Alternatively, the MB-SMF 112 may request and receive priority information for the TMGI from the PCF 105 through step 630, and the MB-SMF 112 may configure the priority information value, based on the received value.

In the process of determining the basic value of priority information in the MB-SMF 112 or PCF 105, when the MBS service is performed through one multicast QoS flow for the MBS session, the priority information value may be determined by values of the ARP, 5QI, and/or paging policy indicator assigned to the corresponding multicast QoS flow. However, when activation is requested for multiple multicast QoS flows for the MBS session, the priority information value may be determined with the value of the ARP, 5QI, and/or paging policy indicator having the highest priority among the ARP, 5QI, and/or paging policy indicator values assigned to each multicast QoS flow.

In step 640, the MB-SMF 112 transmits an MBS session context status notification (Nmbsmf_MBSSession_Context-StatusNotify) message to the SMFs 107 serving the multicast session provided by the AF 130 to inform that a multicast session needs to be activated. In this case, the MBS session context status notification message may include a TMGI to identify a terminal requiring activation of a multicast session, and may include a "multicast session activated" indication to notify that activation of a multicast session is required. In addition, the MBS session context state notification message may include a priority information value for the paging, for example, ARP, 5QI, and/or a paging policy indicator.

The TMGI, "multicast session activated" indication, and priority information values for paging may be included in the Nmbsmf_MBS_Session_Context status notify message or transmitted together with the Nmbsmf_MBSSession_Context status notify message. In addition, when there is a terminal receiving MBS only in an area that can be managed by one SMF 107, the one SMF 107 may be provided. On the other hand, when a terminal receiving MBS is widely distributed in an area managed by a plurality of SMFs 107, a plurality of SMFs 107 may be provided. Therefore, in the following description, it is assumed that the terminal receiving the MBS is widely distributed in the area managed by the plurality of SMFs 107. However, it will be apparent to those skilled in the art that the disclosure includes a case where a terminal receiving an MBS exists only in an area that can be managed by one SMF 107.

The SMF 107 that has received the Nmbsmf_MBSSession_Context status notify message may perform a process for waking up (wake-up or transition to active state) a terminal in an idle state so as to activate a multicast session.

According to the above, the MB-SMF 112 may notify the SMFs 107 by including the TMGI and paging priority information values in the Nmbsmf_MBSSession_Context status notify message as information for notifying the multicast session to be activated. Then, the SMF 107 may start an operation to wake up a terminal in an idle state so that terminals receiving a multicast session corresponding to TMGI among service terminals can receive the service, and may activate a multicast session, such as creating a tunnel for a multicast session, for a base station with an awake terminal.

The SMF 107 may identify terminals receiving MBS corresponding to the TMGI value. Accordingly, in step 650, the SMF 107 may transmit the serviced UE list and/or TMGI by including the first request message, TMGI, and the ARP, 5QI, paging policy indicator values, etc. as the priority information, for example, in the Namf_MT_EnableGroupReachability request message to the AMF 101 serving the corresponding terminals to enable the terminals receiving multicast sessions corresponding to TMGI to wake up from an idle state, thereby waking up the corresponding terminals. At this time, as the UE list, the SUPI value of the UE 10, the list of 5G-GUTI values of the UE 10, or the list of 5G-S-TMSI values may be used.

The AMF 101 may inform the SMF 107 that the terminal is in a connected state through step 655 when the terminal is in a connected state among the UE list received in the Namf_MT_EnableGroupReachability request message. In addition, since the AMF 101 can receive the Namf_MT_EnableGroupReachability request message from the plurality of SMFs 107, the AMF 101 may inform each SMF 107 that the corresponding terminal is in a connected state for a terminal in a connected state among the UE list received from each SMF 107.

In step 657, the SMF 107 may deliver information such as a PDU session ID, an MBS session ID, and a QoS profile for associated QoS flow(s) to the AMF 101 through the N2 SM container for the associated PDU session. The QoS profile for the associated QoS flow may be delivered to the AMF 101 through the N2 SM container for each associated PDU session. Alternatively, the SMF 107 may transmit the QoS profile for the associated QoS flow(s) to the AMF 101 including the MBS session ID, the QoS profile for the associated QoS flow, and the ID list of the associated PDU session in the N2 SM container so that the QoS profile for the associated QoS flow(s) are shared between associated PDU sessions corresponding to MBS sessions.

Meanwhile, according to the disclosure, for a terminal in an idle state, the AMF 101 may request paging from base stations 21 having MBS functions to perform paging to wake up the terminal 10 in step 660. For example, the AMF 101 may transmit a paging request message to base stations 21 having an MBS function among base stations corresponding to a paging area in a multicast service area. Here, the base station corresponding to the paging area in the multicast service area may be base station(s) including a terminal in an idle state among a plurality of base stations providing a multicast service. One or more base stations including the terminal in the idle state may be present, but in FIG. 6, it is shown as one base station in consideration of the complexity of the drawing. However, even in the case of two or more base stations, the operation of the base station shown in FIG. 6 can operate in the same way in all base stations having different MBS functions and receiving a paging request message including TMGI. In the following description, a plurality of base stations will be represented and described as one base station.

As in step 660, the AMF 101 transmits a paging request message including TMGI information to the base station 21 having the MBS function, so that the base station 21 having the MBS function may perform group paging according to the TMGI information. Accordingly, the base station 21 having the MBS function may transmit a paging signal (transmission of the paging signal is not shown in the drawing) to a group of the corresponding terminals using the TMGI information included in the received paging request in step 660. That is, by transmitting a paging signal from the base station 21 having the MBS function, terminals using a multicast service corresponding to TMGI can recognize that the terminals need to wake up.

However, since the base station 22 without the MBS function cannot process TMGI information, the AMF 101 may transmit to the base station 22 without MBS function including 5G-S-TMSI for terminals in idle state as in step 665, and the base station 22 without an MBS function may request individual paging for each terminal using the 5G-S-TMSI.

In steps 660 and 665, the paging request message transmitted by the AMF 101 to the base stations 21 and 22 may include not only TMGI or 5G-S-TMSI to indicate target terminals, but also a paging priority value. The AMF 101 refers to the default value of priority information received from the SMF 107, that is, values such as ARP, 5QI, and/or paging policy indicator to configure the paging priority high according to the operator's policy when the sensitivity to delay is high or when the importance is high, such as public safety or MCPTT. Alternatively, the AMF 101 may configure a relatively higher paging priority than general paging for group paging, based on TMGI, and configure a relatively high paging priority in cases of high importance such as public safety or MCPTT.

Accordingly, when the base stations 21 and 22 receiving the paging request from the AMF 101 receive the paging priority, the base stations 21 and 22 may perform paging by referring to the paging priority. When the paging priority is not included in the paging request, the base stations 21 and 22 may apply the default paging priority value according to the operator's policy. In addition, according to an embodiment, a default paging priority value for individual paging and a default paging priority value for group paging may be configured differently, so that, for example, a relatively high paging priority may be applied to group paging.

The terminal 10 having recognized that the terminal needs to wake up through group paging or individual paging may perform a service request process in step 670. In FIG. 6, the service request process may be a procedure in which the UE 10 transmits a service request message to the AMF 101 through the base stations 21 or 22. In FIG. 6, as described above, when the UE 10 receives a group paging message from the base stations 21 having the MBS function, a service request message may be transmitted to the AMF 101 through the base station 21 having the MBS function. On the other hand, when the UE 10 receives an individual paging message from the base stations 22 without the MBS function, the UE 10 may transmit a service request message to the AMF 101 through the base stations 22 without the MBS function.

In addition, as described above, only one UE 10 is exemplified as a representative of the UE receiving the MBS. Therefore, terminals responding to individual paging may be one or more terminals. In the case of two or more terminals, as illustrated in FIG. 6, a service request message may be transmitted to the AMF 101 through the base station 22 without MB S function that has transmitted a paging signal to itself. In addition, in step 670 of FIG. 6, the terminals responding to group paging and the terminals responding to individual paging may be different terminals. It should be noted that in the case of separately illustrating terminals that respond to group paging and terminals that respond to individual paging in the drawing of FIG. 6, the drawing is illustrated for simplicity because the drawing becomes very complicated.

According to the embodiment, in step 675, the AMF 101 may transmit the Nsmf_PDUSession_UpdateSMContext Request message to support the PDU session by providing SM information to the SMF 107, and receive an Nsmf_P-DUSession_UpdateSMContext response message including SM information from SMF 107 as a response thereto.

Accordingly, the AMF 101 receiving the service request message through the base stations 21 with the MBS function and/or the base stations 22 without the MBS function may recognize that the terminals 10 that sent the service request message are awake, and transmit a list of awakened terminals 10 to the corresponding SMF 107 in step 680. In this case, the list of awakened terminals 10 may be transmitted using a reachability notification message.

The SMF 107 may configure a multicast session corresponding to the list of awakened terminals 10 and notify the AMF 101 that the multicast session has been activated in step 685. Recognizing that the multicast session for the MBS to be provided to the terminal 10 is activated, the AMF 101 may notify the corresponding base stations 21 and 22 by transmitting an N2 SM message in step 690. The N2 SM message may include a TMGI value so that terminals 10 serving multicast sessions corresponding to the TMGI can consider resources for multicast service.

In step 695, a shared tunnel or an individual tunnel for transmitting multicast traffic between the UE 10 and the UPF 108 may be set up. When the UE 10 uses the base stations 21 having the MBS function, a shared tunnel may be set up, and when the UE 10 uses the base stations 22 without the MBS function, an individual tunnel may be set up.

Figure 7:
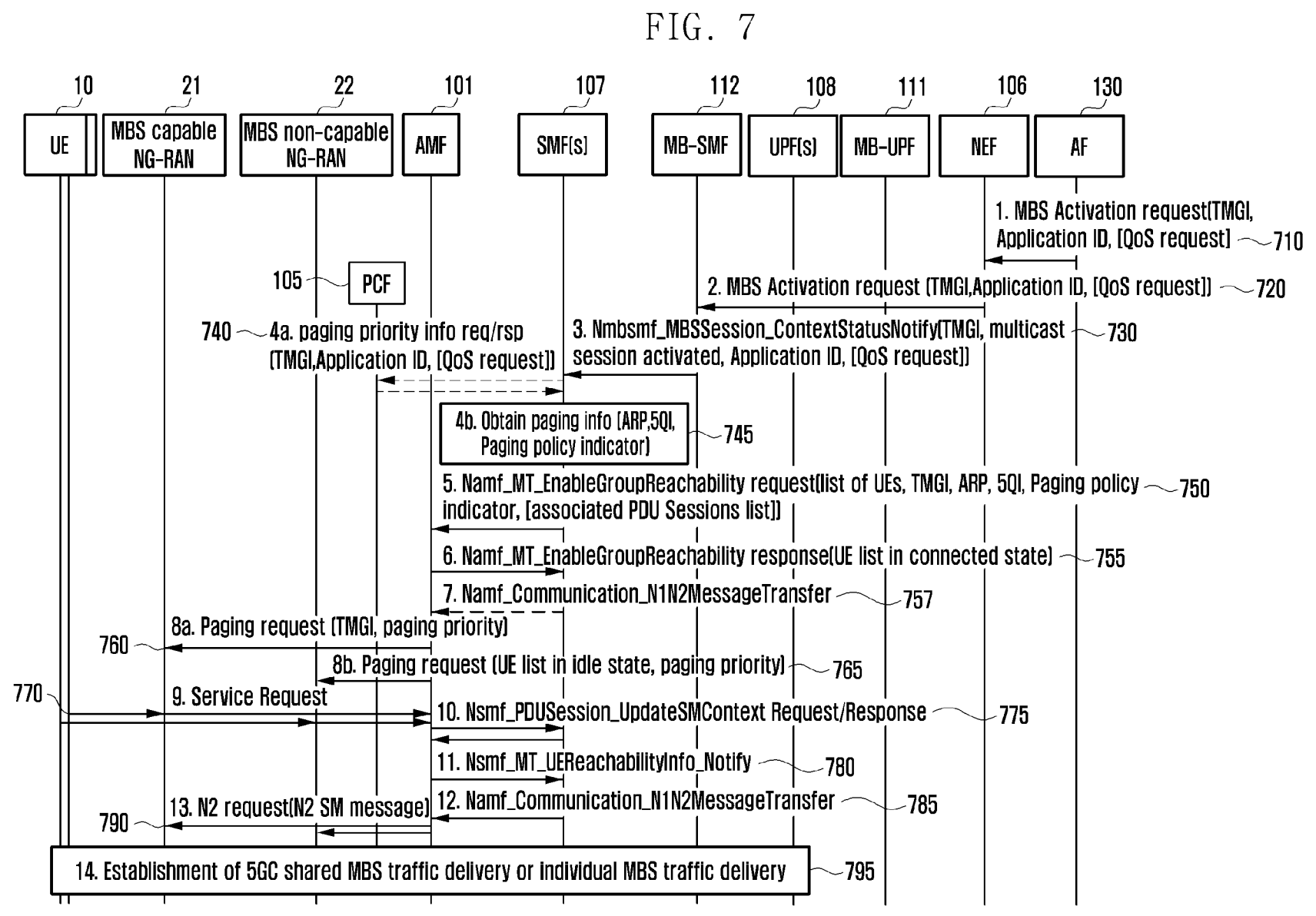

FIG. 7 illustrates a process of configuring paging priority information and waking up a terminal in an idle state according to the process of activating a multicast session at the request of an AF according to an embodiment of the present disclosure.

Prior to referring to FIG. 7, each component of FIG. 7 will be described using the components of the mobile communication network according to the disclosure described in FIG. 1 described above.

In the following description, a UE 10, terminal, mobile terminal, etc. may be used interchangeably for a UE, but all may be understood as the UE 10 illustrated in FIG. 1.

Meanwhile, in FIG. 7, a base stations 21 with an MBS function and a base stations 22 without the MBS function are distinguished and exemplified, and both may be included in an NG-RAN 20. The meaning of the base stations 21 with the MBS function and the base stations 22 without the MBS function may become clearer through the following description.

Referring to FIG. 7, the AF 130 may directly request the 5G system to activate a multicast session. If the AF 130 is outside the trust domain of the 5G system, the AF 130 may transmit an MBS activation request message to activate the multicast session to the MB-SMF 112 through the NEF 106 as in steps 710 and 720. If the AF 130 is within the trust domain of the 5G system, the AF 130 may directly transmit an MBS activation request message to the MB-SMF 112. The MBS activation request message may include an MBS session ID or TMGI to specify which MBS session it is for. In addition, the MBS activation request message may include an application ID serving through a multicast session to notify which QoS flow(s) corresponding to which service flow(s) may activate the session. In addition, the MBS activation request message may include QoS request information about which QoS service is desired to be received while activating the session. The QoS request information may include a 5QI value or a maximum bit rate value.

In step 730, the MB-SMF 112 that has received the activation request may transmit an MBS session context status notification (Nmbsmf_MB_SSession_ContextStatus-Notify) message to the SMFs 107 serving the multicast session provided by the AF 130 to notify that the multicast session needs to be activated. In this case, the MBS session context status notification message may include a TMGI to identify a terminal requiring activation of a multicast session, and include a "multicast session activated" indication to inform that the multicast session needs to be activated. In addition, the MBS session context state notification message may include QoS request information.

The TMGI, "multicast session activated" indication, and QoS request information may be included in the Nmbsmf_MBSSession_Context status notify message, or transmitted together with the Nmbsmf_MBSSession_Context status notify message. In addition, when there is a terminal receiving MBS only in an area that can be managed by one SMF 107, the one SMF 107 may be provided. On the other hand, when a terminal receiving MBS is widely distributed in an area managed by a plurality of SMFs 107, a plurality of SMFs 107 may be provided. Therefore, in the following description, it is assumed that the terminal receiving the MBS is widely distributed in the area managed by the plurality of SMFs 107. However, it will be apparent to those skilled in the art that the disclosure includes a case where a terminal receiving an MBS exists only in an area that can be managed by one SMF 107.

Upon receiving the Nmbsmf_MBSSession_Context status notify message, the SMF 107 may perform a process for waking up (wake-up or transition to active state) a terminal in an idle state so as to activate a multicast session.

According to the above, the MB-SMF 112 may notify the SMFs 107 by including TMGI and QoS request information in the Nmbsmf_MBS_Session_Context status notify message as information for notifying the multicast session to be activated. Then, the SMF 107 may start an operation to wake up a terminal in an idle state so that terminals receiving a multicast session corresponding to TMGI among service terminals can receive the service, and activate the multicast session by creating a tunnel for the multicast session for the base station where the awake terminal is located.

In order to activate the corresponding multicast session, the SMF 107 may acquire priority information for paging through step 4. The priority information may include ARP, 5QI, and/or paging policy indicator.

Through step 740, the SMF 107 may request and receive priority information for the TMGI and application ID or QoS request from the PCF 105, and the SMF 107 may configure a priority information value, based on the received value (step 745).

In the process of determining the basic value of priority information in the SMF 107 or PCF 105, when MBS service is provided through one multicast QoS flow for the MBS session, the priority information value may be determined by values of ARP, 5QI, and/or paging policy indicator assigned to the corresponding multicast QoS flow. However, when activation is requested for multiple multicast QoS flows for the MBS session, the priority information value can be determined with the value of the ARP, 5QI, and/or paging policy indicator having the highest priority among the ARP, 5QI, and/or paging policy indicator values assigned to each multicast QoS flow.

Meanwhile, the SMF 107 may identify terminals receiving MBS corresponding to the TMGI value. Accordingly, in step 750, the SMF 107 may transmit the serviced UE list and/or TMGI by including the first request message, TMGI, and the ARP, 5QI, paging policy indicator values, etc. as the priority information, for example, in the Namf_MT_Enable-GroupReachability request message to the AMF 101 serving the corresponding terminals to enable the terminals receiving multicast sessions corresponding to TMGI to wake up from an idle state, thereby waking up the corresponding terminals. At this time, the UE list may use the SUPI value of the UE 10, the list of 5G-GUTI values of the UE 10, or the list of 5G-S-TMSI values.

The AMF 101 may notify the SMF 107 that the AMF is in a connected state through step 755 in the case of a terminal in a connected state among the UE list received in the Namf_MT_EnableGroupReachability request message. In addition, since the AMF 101 can receive the Namf_MT_EnableGroupReachability request message from the plurality of SMFs 107, for a terminal in a connected state among the UE list received from each SMF 107, each SMF 107 may be notified that the corresponding terminal is in a connected state.

In step 757, the SMF 107 may deliver information such as a PDU session ID, an MBS session ID, and a QoS profile for associated QoS flow(s) to the AMF 101 through the N2 SM container for the associated PDU session. The QoS profile for the associated QoS flow may be delivered to the AMF 101 through the N2 SM container for each associated PDU session. Alternatively, the SMF 107 may transmit the QoS profile for the associated QoS flow(s) to the AMF 101, including the MBS session ID in the N2 SM Container, the QoS profile for the associated QoS flow, and the ID list of the associated PDU session to be shared between associated PDU sessions corresponding to MBS sessions.

Meanwhile, according to the disclosure, for a terminal in an idle state, the AMF 101 may request paging from the base stations 21 having MBS functions to perform paging to wake up the terminal 10 in step 760. For example, the AMF 101 may transmit a paging request message to the base stations 21 having an MBS function among the base stations corresponding to a paging area in a multicast service area. Here, the base station corresponding to the paging area in the multicast service area may be base station(s) including a terminal in an idle state among a plurality of base stations providing a multicast service. One or more base stations including the terminal in the idle state may be present, but In FIG. 7, it is illustrated as if it is one base station in consideration of the complexity of the drawing. However, even in the case of two or more base stations, the operation of the base station shown in FIG. 7 may operate in the same way in all base stations having different MBS functions and receiving a paging request message including TMGI. In the following description, a plurality of base stations will be represented and described as one base station.

As in step 760, the AMF 101 may transmit a paging request message including TMGI information to the base station 21 having the MBS function, so that the base station 21 having the MBS function may perform group paging according to the TMGI information. Therefore, the base station 21 having the MBS function may transmit a paging signal to a group of corresponding terminals using the TMGI information included in the paging request message received in step 760 (transmission of the paging signal is not shown in the drawing). That is, by transmitting a paging signal from the base station 21 having the MBS function, terminals using a multicast service corresponding to TMGI may recognize that the terminals need to wake up.

However, since the base station 22 without the MBS function cannot process TMGI information, the AMF 101 may transmit to the base station 22 without MBS function including 5G-S-TMSI for terminals in the idle state as in step 765, and the base station 22 without an MBS function may request individual paging for each terminal using the 5G-S-TMSI.

In steps 760 and 765, the paging request message transmitted by the AMF 101 to the base stations 21 and 22 may include not only TMGI or 5G-S-TMSI to indicate target terminals, but also a paging priority value. The AMF 101 may refer to the default value of priority information received from the SMF 107, that is, values such as ARP, 5QI, and/or paging policy indicator to configure the paging priority high when the sensitivity to delay is high or when the importance is high, such as public safety or MCPTT according to the operator's policy. Alternatively, the AMF 101 may configure a relatively higher paging priority than general paging for group paging based on TMGI, and configure a relatively high paging priority in cases of high importance such as public safety or MCPTT.

Accordingly, when the base stations 21 and 22 receiving the paging request from the AMF 101 receive the paging priority, the base stations 21 and 22 may perform paging by referring to the paging priority. If the paging priority is not included in the paging request, the base stations 21 and 22 may apply the default paging priority value according to the operator's policy. In addition, according to embodiments, a default paging priority value for individual paging and a default paging priority value for group paging may be configured differently, so that, for example, a relatively high paging priority may be applied to group paging.

The terminal 10 having recognized that the terminal needs to wake up through group paging or individual paging may perform a service request process in step 770. The service request process in FIG. 7 may be a procedure in which the UE 10 transmits a service request message to the AMF 101 through the base stations 21 or 22. In FIG. 7, as described above, when the UE 10 receives a group paging message from the base stations 21 having the MBS function, a service request message may be transmitted to the AMF 101 through the base station 21 having the MBS function. On the other hand, when the UE 10 receives an individual paging message from the base stations 22 without the MBS function, the UE 10 may transmit a service request message to the AMF 101 through base stations 22 having no MBS function.

In addition, as described above, only one UE 10 is exemplified as a representative of the UE receiving the MBS. Therefore, terminals responding to individual paging may be one or more terminals. In the case of two or more terminals, as illustrated in FIG. 7, a service request message may be transmitted to the AMF 101 through the base station 22 having no MBS function that has transmitted a paging signal to itself. In addition, in step 770 of FIG. 7, terminals responding to group paging and terminals responding to individual paging may be different terminals. It should be noted that, in the case of separately illustrating terminals that respond to group paging and terminals that respond to individual paging in the drawing of FIG. 7, the drawing is illustrated for simplicity because the drawing becomes very complicated.

According to the embodiment, in step 775, the AMF 101 may transmit the Nsmf_PDUSession_UpdateSMContext Request message to support the PDU session by providing SM information to the SMF 107, and receive an Nsmf_PDUSession_UpdateSMContext response message including SM information from SMF 107 as a response thereto.

Accordingly, the AMF 101 receiving the service request message through the base stations 21 with the MBS function and/or the base stations 22 without the MBS function may recognize that the terminals 10 that transmitted the service request message are awake, and transmit a list of awakened terminals 10 to the corresponding SMF 107 in step 780. At this time, the list of awakened terminals 10 may be transmitted using a reachability notification message.

The SMF 107 may configure a multicast session corresponding to the list of awakened terminals 10 and notify the AMF 101 that the multicast session has been activated in step 785. The AMF 101 that has recognized that the multicast session for the MBS to be provided to the terminal 10 is activated may notify the corresponding base stations 21 and 22 by transmitting an N2 SM message in step 790. The N2 SM message may include a TMGI value so that terminals 10 serving multicast sessions corresponding to the TMGI can consider resources for multicast service.

In step 795, a shared tunnel or an individual tunnel for transmitting multicast traffic between the UE 10 and the UPF 108 may be set up. When the UE 10 uses the base stations 21 having the MBS function, a shared tunnel may be set up, and when the UE 10 uses the base stations 22 without the MBS function, an individual tunnel may be set up.

Figure 8:
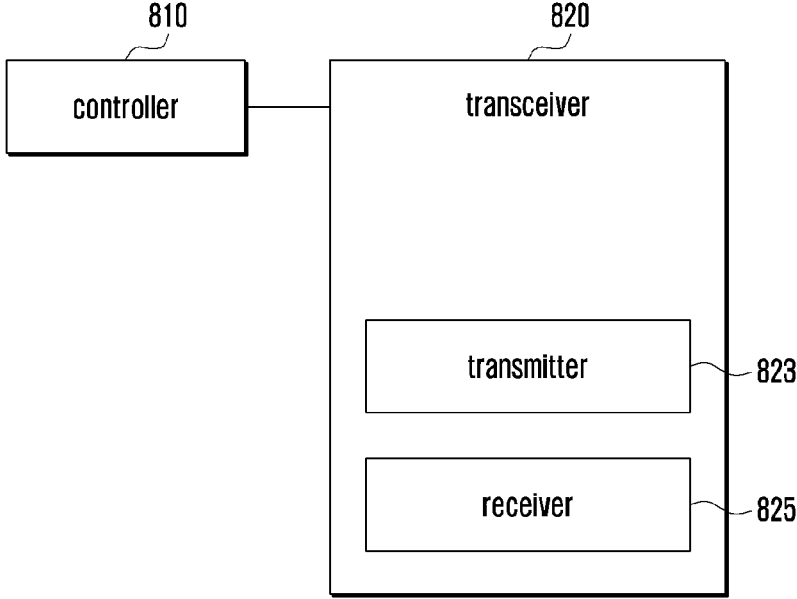
FIG. 8 illustrates a configuration of a terminal according to an embodiment of the present disclosure.

FIG. 8 illustrates a configuration of a terminal according to an embodiment of the present disclosure.

Referring to FIG. 8, the terminal according to an embodiment may include a transceiver 820, and a controller 810 that controls overall operations of the terminal. In addition, the transceiver 820 may include a transmitter 825 and a receiver 823.

The transceiver 820 may transmit/receive signals with other network entities.

The controller 810 may control the terminal to perform any one operation of the above-described embodiments. Meanwhile, the controller 810 and the transceiver 820 do not necessarily have to be implemented as separate modules, but may be implemented as a single component in the form of a single chip. In addition, the controller 810 and the transceiver 820 may be electrically connected. For example, the controller 810 may be a circuit, an application-specific circuit, or at least one processor. In addition, the operations of the terminal may be realized by including a memory device storing a corresponding program code in an arbitrary component in the terminal.

Figure 9:
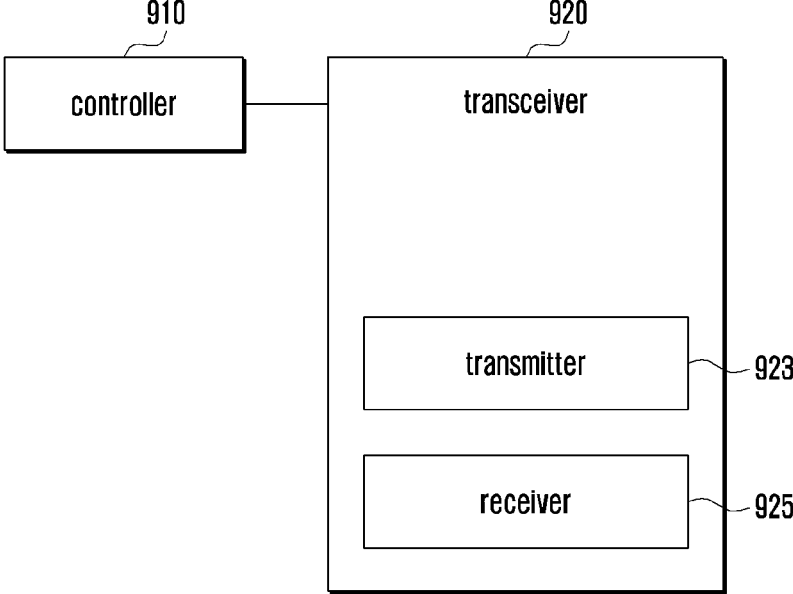
FIG. 9 illustrates a configuration of a network entity according to an embodiment of the present disclosure.

FIG. 9 illustrates a configuration of a network entity according to an embodiment of the present disclosure.

The network entity of the disclosure is a concept including a network function according to system implementation.

Referring to FIG. 9, the network entity according to an embodiment may include a transceiver 920, and a controller 910 that controls overall operations of the network entity. In addition, the transceiver 920 may include a transmitter 925 and a receiver 923.

The transceiver 920 may transmit/receive signals with other network entities.

The controller 910 may control the network entity to perform any one operation of the above-described embodiments. Meanwhile, the controller 910 and the transceiver 920 do not necessarily have to be implemented as separate modules, but may be implemented as a single component in the form of a single chip. The controller 910 and the transceiver 920 may be electrically connected. For example, the controller 910 may be a circuit, an application-specific circuit, or at least one processor. In addition, the operations of the network entity can be realized by including a memory device storing a corresponding program code in an arbitrary component in the network entity.

The network entity may be one of a base station (base station with MBS function, base station without MBS function, gNB, NG-RAN), AMF, SMF, MB-SMF, UPF, MB-UPF, PCF, AF, AS, MB STF, MBSF, UDM, UDR, AUSF, NRF, NEF, and the like.

It should be noted that the configuration diagrams illustrated in FIGS. 1 to 9, exemplary diagrams of control/data signal transmission methods, exemplary operating procedures, and configuration diagrams are not intended to limit the scope of the disclosure. That is, all components, entities, or operation steps described in FIGS. 1 to 9 should not be interpreted as being essential components for the implementation of the disclosure, and may be implemented within a range that does not impair the essence of the disclosure even if only some components are included.

The above-described operations of a base station or a terminal may be implemented by providing a memory device storing corresponding program codes in a bast station or terminal device. That is, a controller of the base station or terminal device may perform the above-described operations by reading and executing the program codes stored in the memory device by means of a processor or central processing unit (CPU).

Various units or modules of a network entity, a base station device, or a terminal device may be operated using hardware circuits such as complementary metal oxide semiconductor-based logic circuits, firmware, or hardware circuits such as combinations of software and/or hardware and firmware and/or software embedded in a machine-readable medium. For example, various electrical structures and methods may be implemented using transistors, logic gates, and electrical circuits such as application-specific integrated circuits.

Although specific embodiments have been described in the detailed description of the disclosure, it will be apparent that various modifications and changes may be made thereto without departing from the scope of the disclosure. Therefore, the scope of the disclosure should not be defined as being limited to the embodiments, but should be defined by the appended claims and equivalents thereof.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a session management function (SMF) in a communication system, the method comprising:
   receiving, from a multicast broadcast session management function (MB-SMF), a first message for activating a multicast broadcast service (MBS) session;
   identifying a most demanding allocation and retention priority (ARP) and fifth generation (5G) quality of service (QoS) identifier (5QI) of at least one all MBS QoS flow within the MBS session; and
   transmitting, to an access and mobility management function (AMF), a second message comprising the most demanding ARP and 5QI of the at least one all MBS QoS flow within the MBS session.

2. The method of claim 1, wherein the first message comprises a Nmbsmf_MBSSession_ContextStatusNotify message.

3. The method of claim 1, wherein the second message further comprises a temporary mobile group identity (TMGI) of the MBS session.

4. The method of claim 1, wherein the second message comprises a Namf_MT_EnableGroupReachability request message.

5. The method of claim 1, wherein the first message is initiated based on at least one of the MB-SMF receiving, from a multicast broadcast user plane function (MB-UPF), a notification for indicating an arrival of a downlink data for the MBS session, or the MB-SMF receiving, from an application function (AF), a MBS session activation request for the MBS session.

6. A method performed by an access and mobility management function (AMF) in a communication system, the method comprising:
   receiving, from a session management function (SMF), a message comprising a most demanding allocation and retention priority (ARP) and fifth generation (5G) quality of service (QoS) identifier (5QI) of all multicast broadcast service quality of service (MBS QoS) flow within a MBS session; and
   transmitting, to a base station, a paging request message based on the most demanding ARP and 5QI of the all MBS QoS flow within the MBS session.

7. The method of claim 6, wherein the message comprises a Namf_MT_EnableGroupReachability request message.

8. The method of claim 6, wherein the message further comprises a temporary mobile group identity (TMGI) of the MBS session.

9. A session management function (SMF) in a communication system, the SMF comprising:
   a transceiver; and
   a controller coupled with the transceiver and configured to:

receive, from a multicast broadcast session management function (MB-SMF), a first message for activating a multicast broadcast service (MBS) session, identify a most demanding allocation and retention priority (ARP) and fifth generation (5G) quality of service (QoS) identifier (5QI) of all MBS QoS flow within the MBS session, transmit, to an access and mobility management function (AMF), a second message comprising the most demanding ARP and 5QI of the all MBS QoS flow within the MBS session.

10. The SMF of claim 9, wherein the first message comprises a Nmbsmf_MBSSession_ContextStatusNotify message.

11. The SMF of claim 9, wherein the second message further comprises a temporary mobile group identity (TMGI) of the MBS session.

12. The SMF of claim 9, wherein the second message comprises a Namf_MT_EnableGroupReachability request message.

13. The SMF of claim 9, wherein the first message is initiated based on at least one of the MB-SMF receiving, from a multicast broadcast user plane function (MB-UPF), a notification for indicating an arrival of a downlink data for the MBS session, or the MB-SMF receiving, from an application function (AF), a MBS session activation request for the MBS session.

14. An access and mobility management function (AMF) in a communication system, the AMF comprising:

a transceiver; and a controller coupled with the transceiver and configured to:

receive, from a session management function (SMF), a message comprising a most demanding allocation and retention priority (ARP) and fifth generation (5G) quality of service (QoS) identifier (5QI) of all multicast broadcast service quality of service (MBS QoS) flow within a MBS session, and transmit, to a base station, a paging request message based on the most demanding ARP and 5QI of the all MBS QoS flow within the MBS session.

15. The AMF of claim 14, wherein the message comprises a Namf_MT_EnableGroupReachability request message.

16. The AMF of claim 14, wherein the message further comprises a temporary mobile group identity (TMGI) of the MBS session.

* * * * *